(12) United States Patent
Mensa et al.

(10) Patent No.: US 10,697,944 B2
(45) Date of Patent: *Jun. 30, 2020

(54) PORTABLE ELECTRONIC SYSTEM FOR THE ANALYSIS OF TIME-VARIABLE GASEOUS FLOWS

(71) Applicant: NANOTECH ANALYSIS S.R.L., Turin (IT)

(72) Inventors: Gianpiero Mensa, Turin (IT); Raffaele Correale, Turin (IT)

(73) Assignee: Nanotech Analysis S.R.L., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/323,765

(22) PCT Filed: Jul. 2, 2015

(86) PCT No.: PCT/IB2015/054994
§ 371 (c)(1),
(2) Date: Jan. 4, 2017

(87) PCT Pub. No.: WO2016/005866
PCT Pub. Date: Jan. 14, 2016

(65) Prior Publication Data
US 2017/0168030 A1    Jun. 15, 2017

(30) Foreign Application Priority Data
Jul. 7, 2014 (IT) .......................... MI2014A001229

(51) Int. Cl.
*G01N 30/72* (2006.01)
*H01J 49/00* (2006.01)
*H01J 49/04* (2006.01)

(52) U.S. Cl.
CPC ....... *G01N 30/722* (2013.01); *G01N 30/7206* (2013.01); *H01J 49/0018* (2013.01); *H01J 49/0427* (2013.01)

(58) Field of Classification Search
USPC ......................................................... 250/282
See application file for complete search history.

(56) References Cited

U.S. PATENT DOCUMENTS 5,481,110 A    1/1996 Krishnaswamy et al.
6,641,783 B1 *  11/2003 Pidgeon ................. G01N 30/20
                                                        210/656

(Continued)

FOREIGN PATENT DOCUMENTS

CN    1585666 A    2/2005
CN    103328966 A    9/2013

(Continued)

OTHER PUBLICATIONS

International Search Report for PCT/IB2015/054994, dated Oct. 30, 2015.

(Continued)

*Primary Examiner* — Phillip A Johnston
(74) *Attorney, Agent, or Firm* — Arent Fox LLP; Michael Fainberg

(57) ABSTRACT

A portable system 1 for analyzing gaseous flows that vary over time is described, the system comprising a sampling chamber 18, a gas sampling module 7, an ion filtering module 8 and an ion detecting module 9. The gas sampling module 7 is configured to adjust an input gaseous flow Fi of gas particles from the sampling chamber 18, ionize said gas particles and to emit the produced ions, so as to generate an ion flow I. The ion filtering module 8 is configured to controllably select at least one type of ion present in the ion flow I and to generate a corresponding at least one homogeneous ion beam I', having an intensity representative of the concentration of the corresponding gas particle in the (Continued)

gaseous composition to be analyzed. The ion detecting module 9 is configured to measure the intensity of the at least one ion beam I'.

17 Claims, 18 Drawing Sheets

(56) References Cited

U.S. PATENT DOCUMENTS

| | | | | |
|---|---|---|---|---|
| 6,997,202 B2* | 2/2006 | Olander | ............... | G05D 7/0652 137/12 |
| 7,530,257 B2* | 5/2009 | Bonne | ................... | B82Y 15/00 73/23.25 |
| 7,767,959 B1 | 8/2010 | Freidhoff | | |
| 8,237,116 B2* | 8/2012 | Correale | ............. | G01N 1/2202 250/281 |
| 8,586,915 B2* | 11/2013 | Correale | ............. | G01N 1/2202 250/281 |
| 8,648,293 B2* | 2/2014 | Correale | ............. | G01N 1/2202 250/252.1 |
| 2006/0016983 A1 | 1/2006 | Kobayashi | | |
| 2010/0200746 A1 | 8/2010 | Osgood et al. | | |

FOREIGN PATENT DOCUMENTS

| | | |
|---|---|---|
| CN | 203339108 U | 12/2013 |
| CN | 103681204 A | 3/2014 |
| CN | 103811268 A | 5/2014 |
| EP | 2273530 A1 | 1/2011 |
| WO | WO 2006/15306 A2 | 2/2006 |

OTHER PUBLICATIONS

Chinese Search Report issued in counterpart Chinese Application No. 2015800477460 dated Jan. 26, 2018.
Andrawes, F.F., et al., "Simult. Determination of Trace Amts of Hydrogen, Oxygen, Nitrogen, Carbon Monoxide, Carbon Dioxide, Methane, Ethane, Ethylene, and Acetylene by 2 Gas Chromatographic Columns in Parallel and 1 Detector," Analytical Chem., vol. 51, No. 3, Mar. 1979, pp. 462-463.

* cited by examiner

PORTABLE ELECTRONIC SYSTEM FOR THE ANALYSIS OF TIME-VARIABLE GASEOUS FLOWS

CROSS-REFERENCE TO RELATED APPLICATIONS

This application is a National Stage entry of International Application No. PCT/IB2015/054994 filed on Jul. 2, 2015, which claims priority to Italian Patent Application No. MI2014A001229 filed on Jul. 7, 2014. The disclosures of the prior applications are hereby incorporated in their entirety by reference.

TECHNOLOGICAL BACKGROUND OF THE INVENTION

Field of Application

This invention relates to the field of electronic systems for analyzing a composition of gaseous flows that vary over time such as, for example, those flows output from a chromatographic column.

The invention also comprises apparatuses and methods for analyzing time-variable gaseous flows.

Description of the Prior Art

There are several known systems for analyzing gaseous flows. Typically, but not exclusively, such systems operate in combination with a gas chromatographic column, whose output flows they analyze.

For example, systems for analyzing gaseous flows are known using mass spectrometers.

In order to operate, these known systems exploit the principles of mass spectrometry, are only able to work on constant flows and, in addition, require the preparation of vacuum-pressure environments (for example, below 1 mbar and, preferably, around $10^{-3}$ mbar), within which they ionize the gaseous particles necessary for the application of mass spectrometry techniques.

The technical requirements of the known systems mentioned above imply that these systems must be equipped with means for measuring and controlling the flow intensity and pumping means. This may result in various drawbacks.

The flow measurement and control means are necessary for working as much as possible with constant flows when the actual flow injected is a flow of non-constant intensity. In particular, they must comprise at least one flow meter having high-precision and temperature-controlled and that is, therefore, relatively bulky and expensive.

The pumping means, suitable to extract from the ionization environment a large part of the injected flows to be analyzed, in order to produce the vacuum conditions necessary for ionization, may themselves be relatively bulky and expensive.

In addition to the above, the precision of the analysis depends on the fidelity with which the gaseous composition to be analyzed is represented by the vacuum-pressure gaseous residues obtained as a result of the pumping. Such precision may be inadequate for most applications, possibly requiring complex procedures and systems for correction and adjustment.

Finally, in the known solutions mentioned above, it is not possible to improve the precision of the analysis, while the analysis is being performed, by enriching, in a controlled manner, the gaseous composition to be analyzed.

Furthermore, it is not possible to perform a calibration during operation.

On the other hand, in a growing number of important applications, the need emerges to have systems for the analysis of time-variable gaseous flows, that are compact, portable and inexpensive, and at the same time precise and reliable.

This can be advantageous, particularly but not exclusively, for the analysis of gaseous compositions output from one or more gas chromatographic columns.

As illustrated above, the known systems for gaseous analysis are not able to meet the above-mentioned desired requirements or the above-mentioned needs.

In light of the above, the object of this invention is that of devising and making available a device for analyzing time-variable gaseous flows, as well as related apparatuses and methods employing such a device, that are improved so as to meet the above-mentioned needs, and that are able to overcome, at least partially, the drawbacks described above with reference to the known art.

SUMMARY OF THE INVENTION

This object is achieved by a system according to claim 1.

Additional embodiments of the system are defined in the dependent claims from 2 to 17.

Gas chromatographic analysis apparatuses, comprising the above system, are defined in claims 18 and 19.

A method for analyzing time-variable gaseous flows, employing the system of the invention, is defined in claim 20.

Additional embodiments of the method are defined in the dependent claims from 21 to 23.

BRIEF DESCRIPTION OF THE DRAWINGS

Further characteristics and advantages of a system for analyzing time-variable gaseous flows, according to this invention, and apparatuses and methods employing such a system, will result from the following description of preferred embodiments, provided as non-limiting examples, with reference to the accompanying figures, wherein.

DETAILED DESCRIPTION

Figure 1:
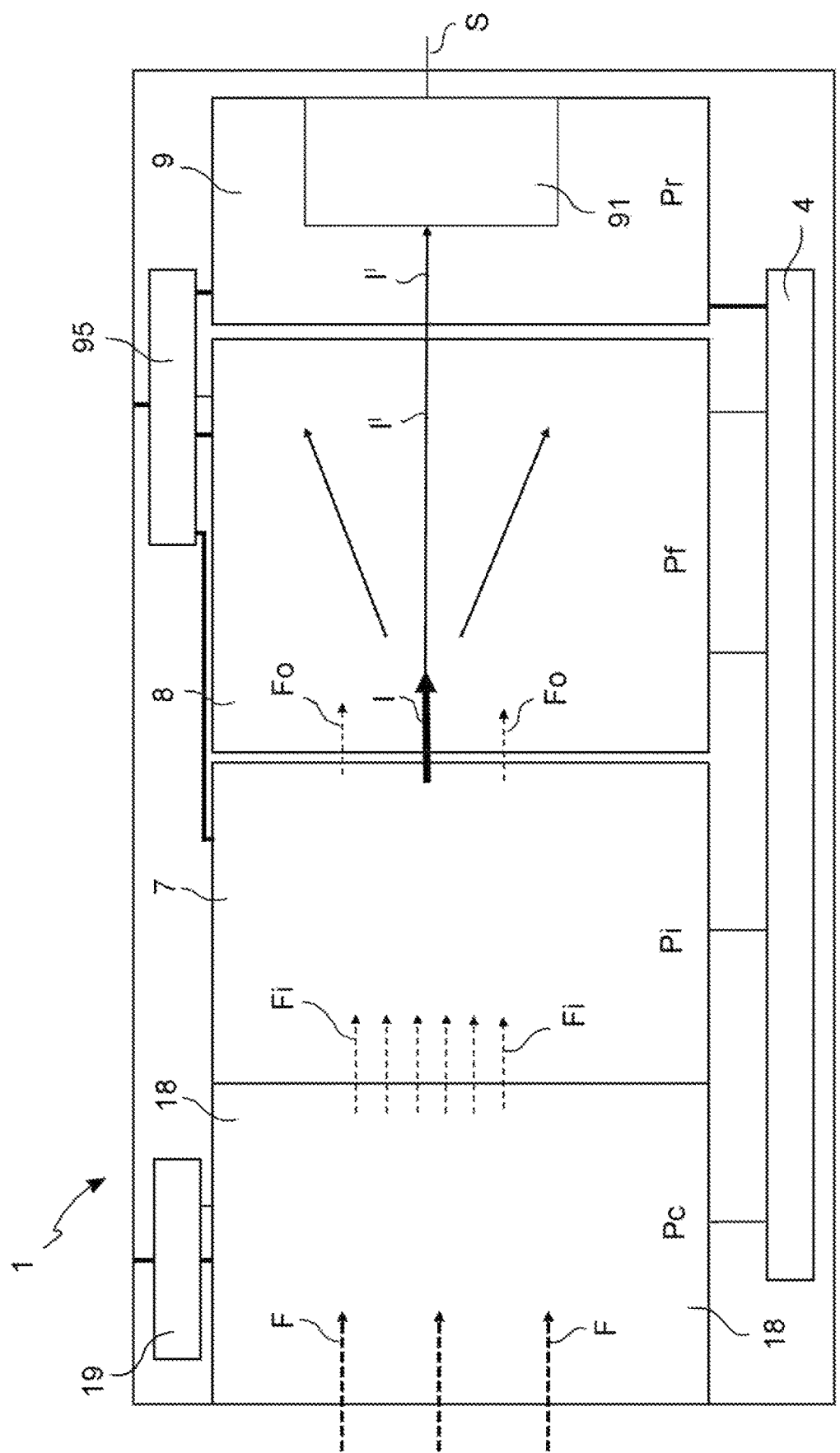
FIG. 1 is a simplified functional diagram of the system according to the invention.
Figure 2:
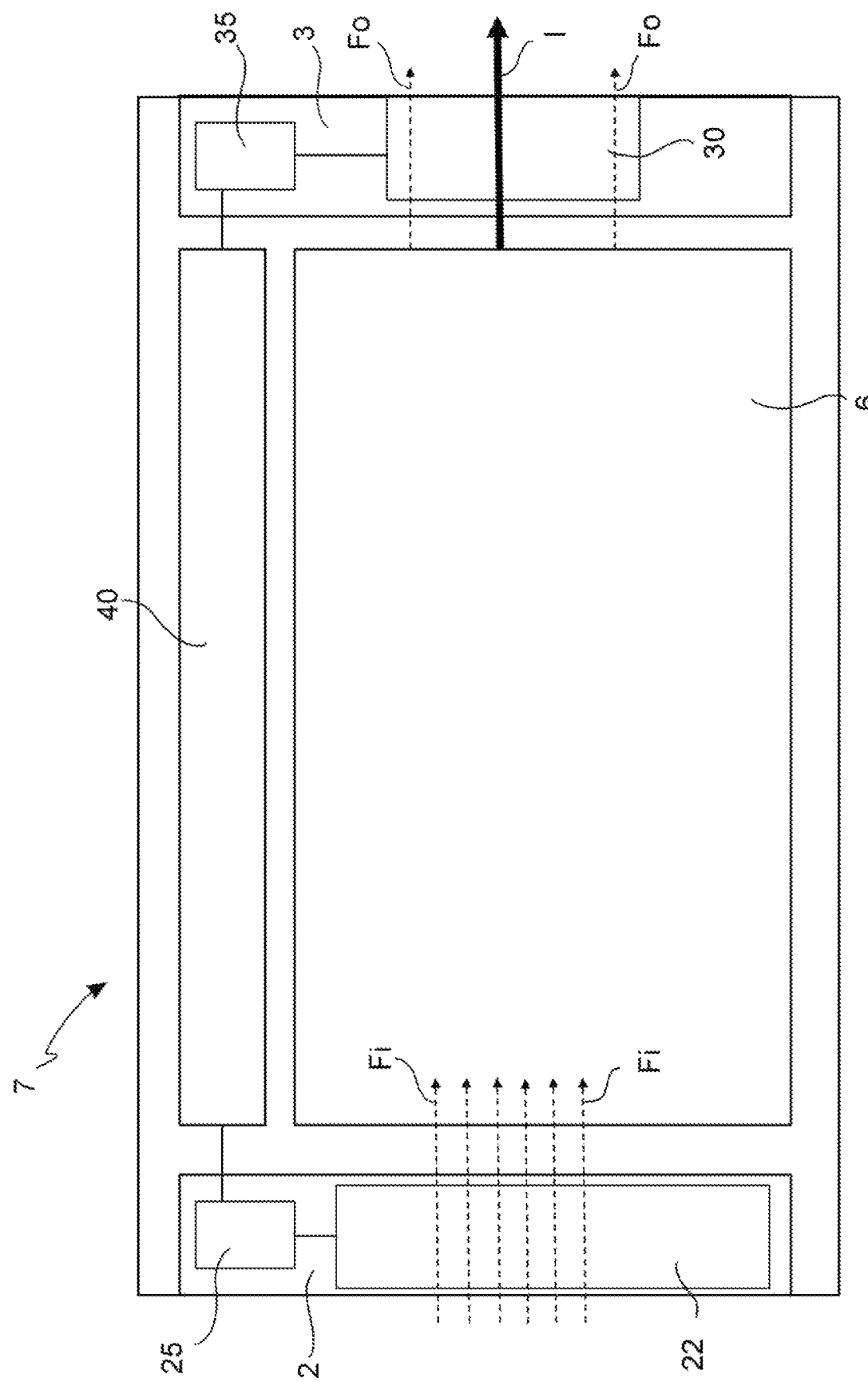
FIGS. 2-6 illustrate portions of a sampling module comprised in an embodiment of the system.

With reference to FIGS. 1-16 and, in particular, to FIG. 1, a portable system 1 for analyzing time-variable gaseous flows is described.

This system 1 comprises a sampling chamber 18, a gas sampling module 7, an ion filtering module 8 and an ionic detection module 9.

The sampling chamber 18 is suitable to be kept at a controlled sampling pressure Pc, and it is configured to receive at least one gaseous flow F having a gaseous composition (i.e., a gas composition) to be analyzed that is variable over time.

The gas sampling module 7, arranged in fluidic communication with the sampling chamber 18, is configured to adjust an input gaseous flow Fi of gas particles (i.e., gaseous particles) from the sampling chamber 18, and an output gaseous flow Fo from the sampling module 7, so as to reproduce inside the sampling module 7 a gaseous composition representative of the gaseous composition to be analyzed.

In addition, the sampling module 7 is configured to ionize said gas particles and to emit the ions produced, so as to generate an ion flow I having an ion composition representative of the gaseous composition to be analyzed.

Moreover, the sampling module 7 is suitable to maintain therein a controlled ionization pressure Pi.

The sampling module 7 is configured in such a way that the input gaseous flow Fi comprises a plurality of microflows at a molecular or predominantly molecular regime, at the sampling pressure Pc, and the output gaseous flow Fo is a flow at a molecular or predominantly molecular regime, at the ionization pressure Pi.

The ion filtering module 8 is operatively connected to the sampling module 7 to receive the ion flow I, and is configured to controllably select at least one type of ions present in the ion flow I and to generate a corresponding at least one homogeneous ion beam I', having an intensity representative of the concentration of the corresponding gas particle in the gaseous composition to be analyzed.

The ion detecting module 9 is operatively connected to the ion filtering module 8 to receive the at least one ion beam I', and is configured to measure the intensity of such at least one ion beam I' and to generate a corresponding electric signal S representative of the concentration of the corresponding gas particle in the gaseous composition to be analyzed.

According to an embodiment, the system 1 is configured to analyze a gaseous flow F that is variable over time in intensity and composition.

According to an implementation example, the system 1 is configured to perform gas-chromatographic analysis of at least one flow F output from a respective at least one gas chromatographic column. In this case, the sampling chamber 18 is configured to allow a fluidic communication with the at least one chromatographic column, so as to receive the at least one output flow F.

According to a further implementation example, the system 1 is configured to carry out gas-chromatographic analysis of a plurality of flows F output from respective gas chromatographic columns. In this case, therefore, the system 1 is suitable to be arranged in fluidic communication with a plurality of gas chromatographic columns.

According to an embodiment, the system 1 is an integrated device.

In a typical example embodiment, the above-mentioned ionization pressure Pi, maintained within the sampling module 7, is a vacuum pressure.

In particular, the ionization pressure Pi may be between $10^{-2}$ mbar and $10^{-6}$ mbar.

According to an implementation option, the filtering module 8 and the ion detecting module 9 of the system 1 are kept at a pressure lower than, or equal to, the ionization pressure Pi.

According to a preferred embodiment option, the system 1 is configured to maintain an ionization pressure Pi within the sampling module 7 in the range between $10^{-2}$ mbar and $10^{-5}$ mbar; a filtering pressure Pf, in the filtering module 8, lower than the ionization pressure, and typically in the range between $10^{-5}$ and $10^{-7}$ mbar; and a detection pressure Pr, in the detecting module 9, lower than the filtering pressure, and typically in the range between $10^{-6}$ and $10^{-8}$ mbar.

According to various embodiment examples, the sampling pressure Pc is kept constant, or it is varied in a controllable manner, as a function of the gaseous flow F entering the sampling chamber 18.

According to an embodiment option, the sampling pressure Pc is in a range between $10^{-3}$ mbar and $10^4$ mbar.

In particular, the sampling pressure Pc may be the atmospheric pressure or similar.

With reference to the input gaseous flow Fi and output gaseous flow Fo, it should be noted that, according to a commonly used nomenclature, the terminology "flow at a molecular regime," indicates a gaseous flow in which the mean free path A of a gaseous particle (i.e., of a gas molecule) is comparable to, or larger than, the dimensions D of the channel or container in which it is located, due to which the path of each particle is nearly free and independent with respect to that of the other particles.

The commonly accepted definitions, regarding the classification of flows, agree in defining as "flow at a molecular regime" a flow in which the parameter D/A is comparable to, or less than, 1.

Moreover, a "flow at a predominantly molecular regime" is defined as a flow in which the parameter D/λ is of the order of magnitude of a few units (for example, conventionally, <10): in fact, in such conditions, although collisions between particles are not, strictly speaking, reduced to zero, most of the particles are in molecular regime conditions for most of the time.

The book "*Vacuum Technology*" by A. Roth, NHPC, 1976, Chapters 2 and 3, for example, can be considered as an authoritative theoretical reference on the subject.

Obviously, the mean free path A also depends on the conditions of pressure and temperature; in particular, it is directly proportional to the temperature measured in Kelvin and is inversely proportional to the pressure. Assuming that the significant use conditions of valve systems are at ambient temperature conditions (for example in a range between 273° K and 313° K), or at a different temperature, as long as substantially constant, the pressure results to be the essential parameter.

In conditions of vacuum pressures (for example, below 1 mbar) and even more of high vacuum (for example, below $10^{-3}$ mbar) it is possible to obtain flows at a predominantly molecular regime even through channels of millimetric, or higher, dimensions.

On the contrary, in the other, non-vacuum, pressure conditions and, in particular, at atmospheric pressure or higher, it is necessary to reduce the dimensions of the channels to sub-micrometric values.

Again with reference to FIG. 1, it should be noted that, according to an embodiment, the system 1 also comprises first pumping means 19, configured to extract gas from the sampling chamber 18, so as to control the sampling pressure Pc, and second pumping means 95, configured to extract gas from the sampling module 7, so as to control, inter alia, the ionization pressure Pi. The system 1 also comprises pumping control means able to control the first and second pumping means.

In an implementation example, the first pumping means 19 comprise a valve 19 controllable by the pumping control means.

In another implementation example, the first pumping means 19 comprise a three-way valve module controllable by the pumping control means.

According to an embodiment option, the second pumping means 95 comprise at least one miniaturized pumping member 95.

Such miniaturized pumping member 95 may be, for example, an ion micro-pump, or a "getter".

According to a particular implementation option (shown in FIG. 8), the system 1 comprises a first miniaturized pumping member 95 installed in the ion filtering module 8, and configured to maintain the sampling module 7 in ionization pressure conditions Pi and both the ion filtering module 8 and the ion detecting module 9 at pressures equal to, or lower than, the ionization pressure Pi.

According to other implementation options (shown in FIGS. 6 and 9), the system 1 may include a second pumping member 95 installed in the sampling module 7 and/or a third pumping member 95 installed in the ion detecting module 9.

In this case, the above-mentioned pumping members are typically configured to maintain a filtering pressure Pf, in the filtering module 8, lower than the ionization pressure Pi, and typically in the range between $10^{-5}$ and $10^{-7}$ mbar; and to maintain a detection pressure Pr, in the detecting module 9, less than the filtering pressure Pf, and within the interval between $10^{-6}$ and $10^{-8}$ mbar.

With reference to the sampling chamber 18, it should be noted that, according to an implementation example, it is miniaturized (for example having a volume of the order of $cm^3$) and is integrated into the integrated device that forms the system 1.

According to an embodiment, usable for gas chromatographic analysis applications, the sampling chamber 18 comprises at least one injector member 180, suitable to be coupled to a respective gas chromatographic column, and configured to manage the injection into the sampling chamber 18 of the gaseous flow F output from the gas chromatographic column.

In this case, if the system 1 is implemented by means of a single integrated device, this integrated device communicates fluidically with the outside exclusively through the injector member 180 and the first pumping means 19.

According to an embodiment, as illustrated in FIGS. 2-7, the sampling module 7 comprises an ionization chamber 6, an inlet member 2 and an ion outlet member 3.

The ionization chamber 6 is suitable to be kept at the ionization pressure Pi and is configured to contain and ionize the gas particles present therein.

It should be noted that the sampling pressure Pc is controllable mainly through the first pumping means 19. The ionization pressure Pi is finely controllable, even independently from the pressure Pc, through the inlet nano-holes and the outlet orifice that will be illustrated below.

The inlet member 2 is configured to inhibit or allow and/or adjust an inlet in the ionization chamber of a gaseous flow Fi. The inlet member 2 comprises a gaseous flow adjusting interface 22 provided with a plurality of nano-holes 20, having sub-micrometric dimensions, suitable to be opened or closed in a controlled manner, to inhibit or allow the plurality of micro-flows at a molecular or predominantly molecular regime.

The ion outlet member 3 is operatively connected to the ion filtering module 8 and is configured to inhibit or allow and/or adjust the output gaseous flow Fo, at a molecular or predominantly molecular regime, and the ion flow I of the generated ions.

According to an implementation option, the outlet member 3 comprises an orifice 30, which can be opened or closed in a controlled manner, so as to control an output conductance for the output gaseous flow Fo.

Figure 3:
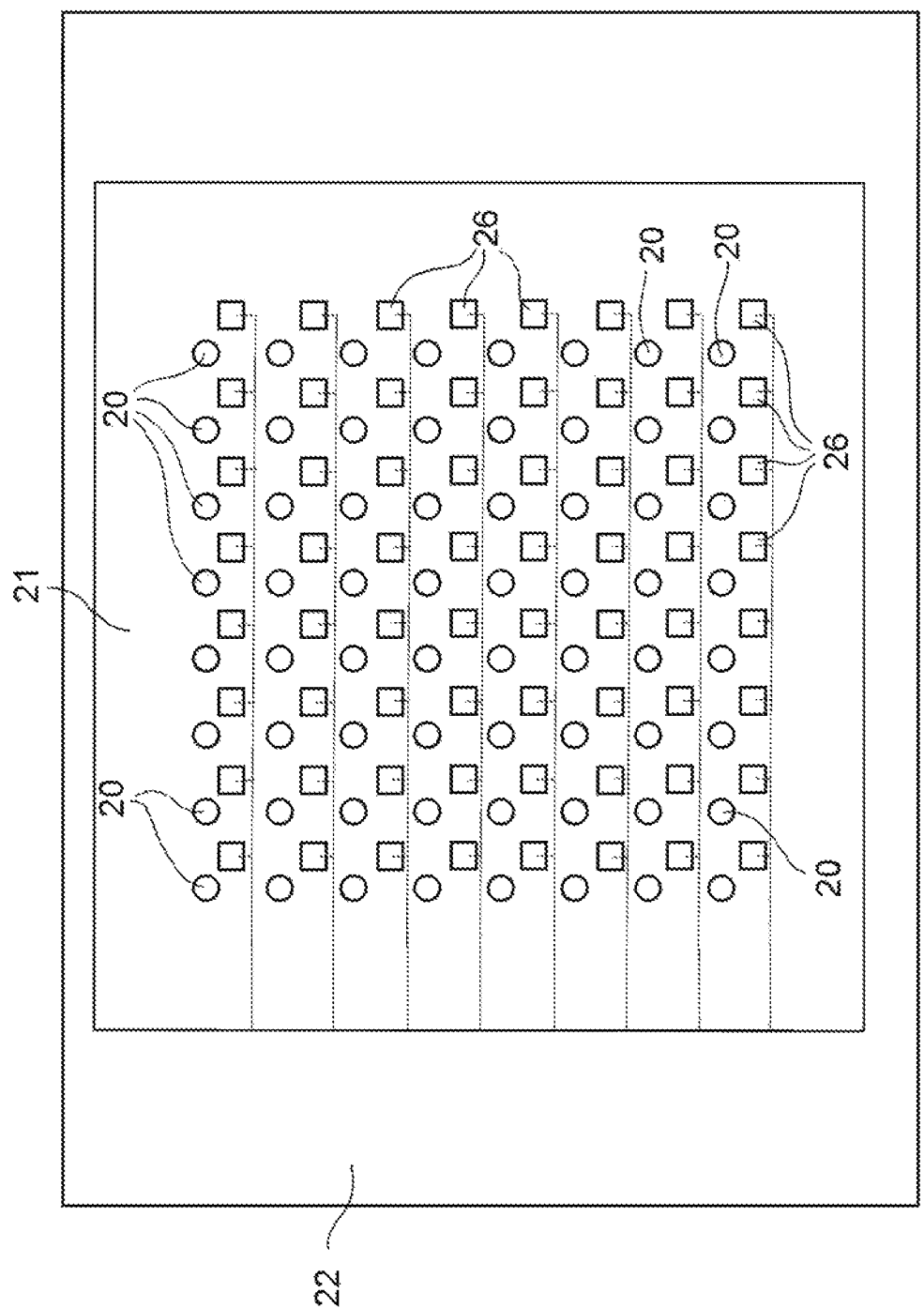
Figure 4:
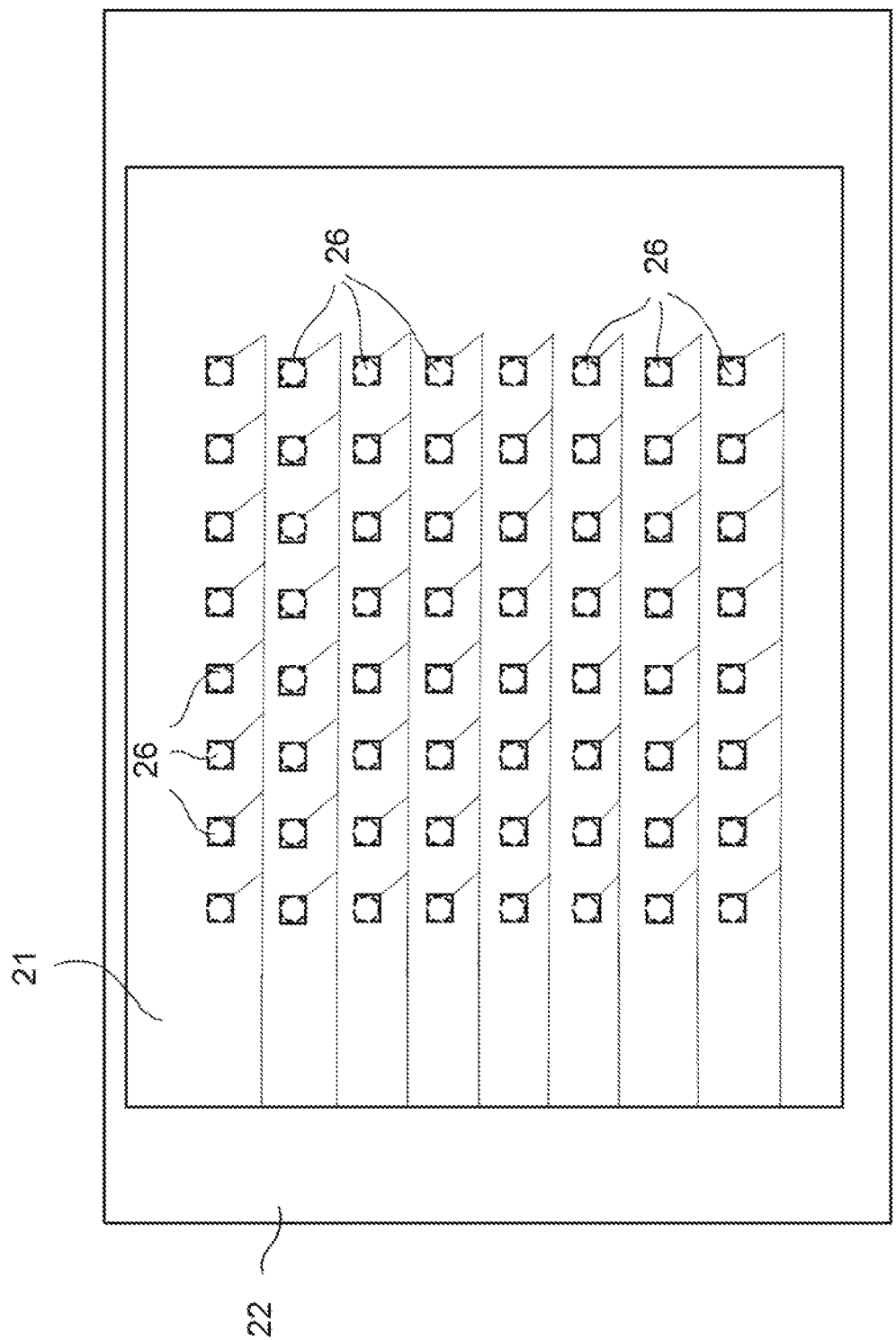

FIGS. 3 and 4 illustrate the adjusting interface 22 of the inlet member 2 of the sampling module 7.

According to an implementation example, each nano-hole 20 is configured to allow micro-flows between $10^{-8}$ and $10^{-6}$ mbar·l·sec$^{-1}$. In this way, the adjusting interface 22 can control gaseous flows with an accuracy and a very fine granularity, equal to one of these micro-flows. Other flow values are of course possible, depending on the dimensions with which the nano-holes are made, and on the pressure gradient to which the nano-holes are subjected.

The fact that the flow adjusting interface allows a passage of gas exclusively through the nano-holes of sub-micrometric dimensions is enabling with respect to the functionality of allowing flows at a molecular or predominantly molecular regime. In fact, it can be calculated that, within a very wide temperature range that covers all conditions of reasonable use, and for almost every type of gas, channels of sub-micrometric diameter allow obtaining the values of D/A desired (less than 10, in any case, and preferably comparable to 1 or lower) even at atmospheric or higher pressures.

Advantageously, the specific dimension chosen, within the sub-micrometric interval, for the nano-holes of a specific embodiment of the system, can take into account of the pressure conditions specified in the conditions of use.

The sub-micrometric dimensions of each nano-hole imply that the diameter of the nano-hole (i.e., the dimension on a plane substantially perpendicular to the flow) is of the order of magnitude of hundreds of nanometres or less.

According to an implementation example, each nano-hole 20 has a diameter in the range from 10 to 100 nm, and preferably between 20 and 100 nm. Other values (for example between 50 and 500 nm) are possible, depending on the design specifications of the system.

According to an implementation example, the nano-holes are formed in a membrane 21, having a thickness of the order of hundreds of nanometres (nm) or lower (an order of magnitude typically comparable to that of the diameter), and preferably between 50 and 500 nm.

According to a preferred embodiment, each nano-hole 20 has a defined geometry and a deterministically measurable conductance, the conductance being a parameter that quantifies the micro-flows that can pass through the nano-hole.

Preferably, the geometry of the nano-holes 20 is substantially cylindrical.

In the embodiment described above, each nano-hole is approximately a cylinder, or tube, having a diameter of the order of tens or hundreds of nm, and a height of the order of hundreds of nm.

According to various implementation examples covered by the invention, the distribution, number and size of the nano-holes 20, formed in a membrane 21 of the adjusting interface 22, can be the most varied. The adjusting interface 22 can thus comprise nano-holes 20 of all equal sizes, or different from each other, in any combination.

The number of nano-holes 20 of the adjusting interface 22 can vary from several tens to several hundreds, or even thousands. This advantageously allows obtaining flows of significant intensity, even if formed by micro-flows, by opening all the nano-holes.

The arrangement of the nano-holes 20 on the adjusting interface 22 may be the most varied.

According to a preferred implementation example, the nano-holes 20 are arranged in a two-dimensional array of rows and columns.

According to an embodiment option, the adjusting interface 2 comprises one or more flow control windows, each window comprising a membrane 21, through which the nano-holes 20 are derived.

Each membrane 21 may be planar or non-planar.

In a typical implementation example, the membrane 21 is planar, substantially rectangular or square, with sides of dimensions of the order of tens of micrometres, and is able to contain a number of nano-holes of the order of hundreds.

It should be noted that the adjusting interface 22, with a membrane 21 and any predetermined arrangement of nano-holes having the desired dimensions and geometries, can be obtained by techniques, in themselves known, for manufacturing membranes with holes of sub-micrometric dimensions.

Such techniques are known, for example, in the context of nano-technologies for the production of membranes for chemical-biological applications. Another example of usable techniques involves the use of silicon membranes that are perforated, in a controlled manner, by a SEM (Scanning Electron Microscope) equipped with a FIB (Forced Ion Beam) module. In this way, nano-holes of the type described above (in literature sometimes also called "nano-orifices" or "nano-pores") can be formed on the silicon membrane, as shown for example in the scientific papers: Lo, Aref, Bezryadin "*Fabrication of symmetric sub-5nm nano-pores using focused ion and electron beams*" (Nanotechnology 17(2006) 3264-3267); and Stein et al., "*Ion Beam Sculpting Time Scales*" (Physical Review Letter, vol. 89, no. 27, 30 Dec. 2002).

According to an embodiment option, the sampling module 7 further comprises first actuating means 25, second actuating means 35 and sampling module control means 40.

The first actuating means 25 comprise a plurality of miniaturized nano-hole opening/closing members 26, each miniaturized opening/closing member 26 being suitable to open or close a corresponding nano-hole 20, so as to maximize or minimize, respectively, the nano-hole 20 conductance.

In a particular implementation example, each miniaturized nano-hole opening/closing member 26 is configured to hermetically seal the respective nano-hole 20, reducing to zero its conductivity, or to fully open the nano-hole 20, allowing a flow of gas through it. The property of "hermetic" closure can be defined in the design stage in relation to the size of gaseous molecules whose flow must be controlled.

The second actuating means 35 comprise a shutter 36, configured to completely close, or to keep completely open, or partially occlude, in a controlled manner, the orifice 30 of the ion outlet member 3.

The sampling module control means 40 (for example a processor 40) are configured to control the first 25 and second 35 actuating means.

The most varied ways of actuating the nano-holes are made possible by the structure of the sampling module 7, illustrated here.

In fact, the control means 40 are configured to control the gaseous flow Fi passing through the adjusting interface 22 by determining the pattern of opened and closed nano-holes 20 in terms of the number and position of opened and closed nano-holes, and/or by determining the ratio of the opening time and closing time of the nano-holes 20, or of the duty cycle.

In a preferred example embodiment, able to offer a maximum flexibility of use, the control means 40 are configured to control the inlet actuating means 25, so that each nano-hole 20 can be opened or closed individually and in an independent manner with respect to the other nano-holes 20.

According to an alternative example, the control means 40 are configured to control the actuating means 25, so as to selectively open or close one or more groups of nano-holes 20, comprising, for example, sub-sets of nano-holes adjacent to each other in an array. In this case, the nano-holes of each sub-set can be opened or closed, independently of the opening/closing of the nano-holes of the other sub-sets.

According to another example, the nano-holes 20 are all opened or all closed, collectively.

Figure 5:
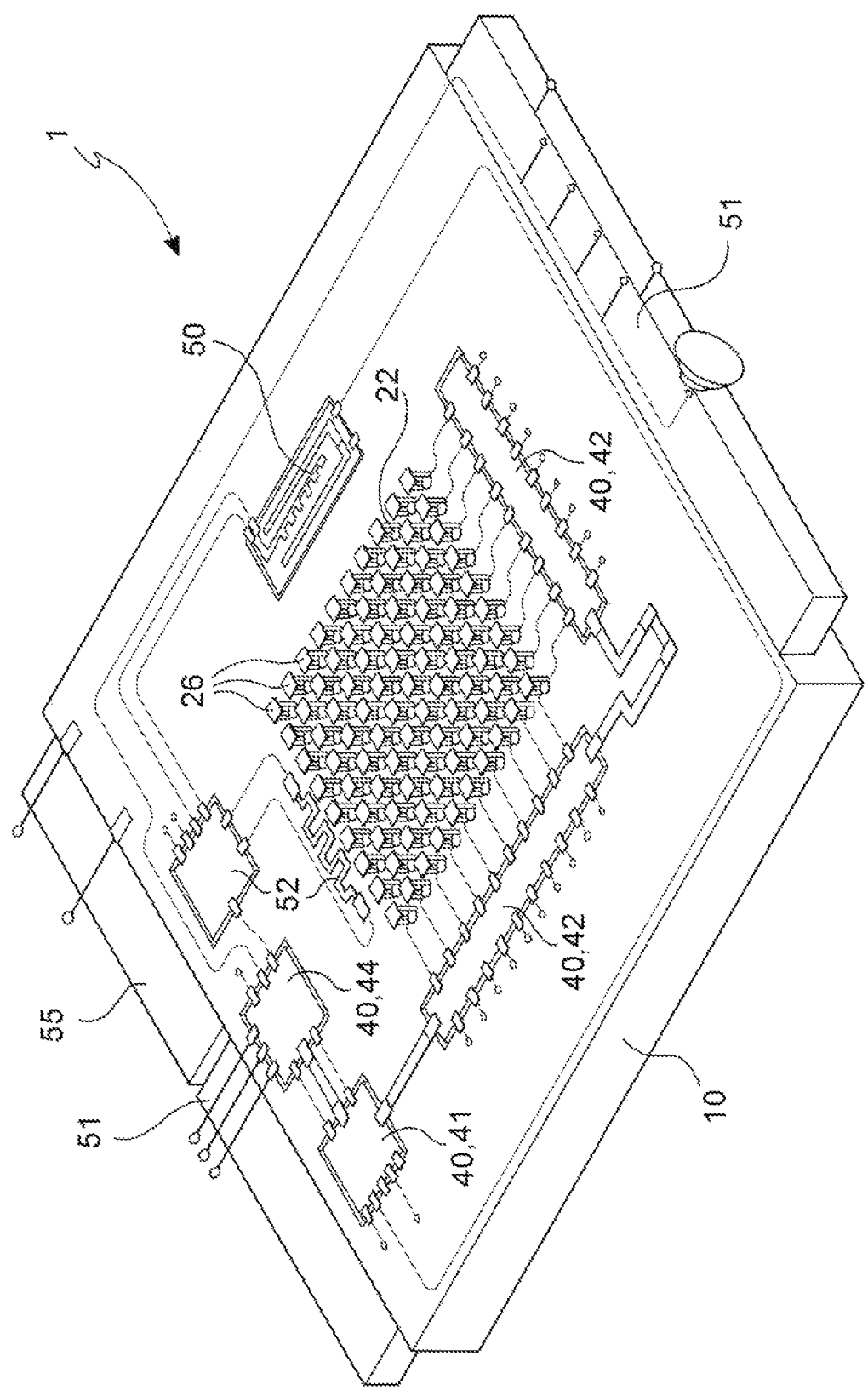

By virtue of the above, the sampling module 7 provides control of inlet flows in which any combination, pattern and/or arrangement of opened or closed nano-holes is possible: for example, with nano-holes all opened (as shown in FIGS. 3 and 5) or with nano-holes all closed (as shown in FIG. 4) or with some nano-holes opened and others closed. Furthermore, the combination, pattern and/or arrangement of opened or closed nano-holes can be dynamically changed over time in a desired manner.

According to possible implementation options, the inlet actuating means 25 are actuated electro-mechanically or electro-magnetically.

According to an embodiment option, illustrated in FIG. 5, each miniaturized opening/closing member 26 comprises a plug 26 electro-mechanically actuatable to close or open the corresponding nano-hole 20, through an axial movement with respect to the nano-hole 20.

According to another embodiment option, each miniaturized closing/opening member comprises a micro-cantilever, electro-magnetically actuatable, having, at an oscillating end, a substantially conical tip, suitable to be inserted in or extracted from the nano-hole.

According to a still further embodiment option, each miniaturized closing/opening member comprises a cylinder, having a diameter substantially equal to that of the corresponding nano-hole, electro-magnetically actuatable to be inserted in, or extracted from, the corresponding nano-hole, through an axial movement with respect to the nano-hole.

The options described above provide for an individual and independent actuation of each nano-hole.

For applications in which a collective actuation of the nano-holes is sufficient, a further embodiment option provides that the inlet actuating means 25 comprise a multiple opening/closing oscillating planar member, configured to concurrently open/close all the nano-holes 20 of the adjusting interface 2.

In this case, the single miniaturized nano-hole opening/closing members can be arranged on one side of the planar member in a configuration corresponding to that of the nano-holes, so that each miniaturized opening/closing member is simultaneously inserted into, or extracted from, the corresponding nano-hole, upon a corresponding movement of the planar member.

According to an implementation example, the inlet actuating means 25 are arranged on a side of the adjusting interface 22 and are configured to open/close the opening of each nano-hole 20 corresponding to that side.

According to an alternative implementation example, such inlet actuating means 25 (or at least parts of them) are arranged on both sides of the adjusting interface 22, and are configured for opening/closing both openings of each nano-hole 20, corresponding to both sides of the adjusting interface 22, i.e., both ends of the tubular micro-channel formed by the nano-hole. In this case, each miniaturized nano-hole opening/closing member 26 is configured to penetrate into the nano-hole 20, in conditions of closure, entering from the respective side.

Advantageously, the miniaturized opening/closing members 26 are also suitable (or configurable) for cleaning and clearing each nano-hole 20 of possible obstructions (due, for example to molecular mono-layers that can be deposited), upon each operative event of closure and subsequent opening or upon specific anti-obstruction closing/opening events. This property is important for allowing the use of the system in the most various environments, including environments of industrial processes with pollutants.

Figure 6:
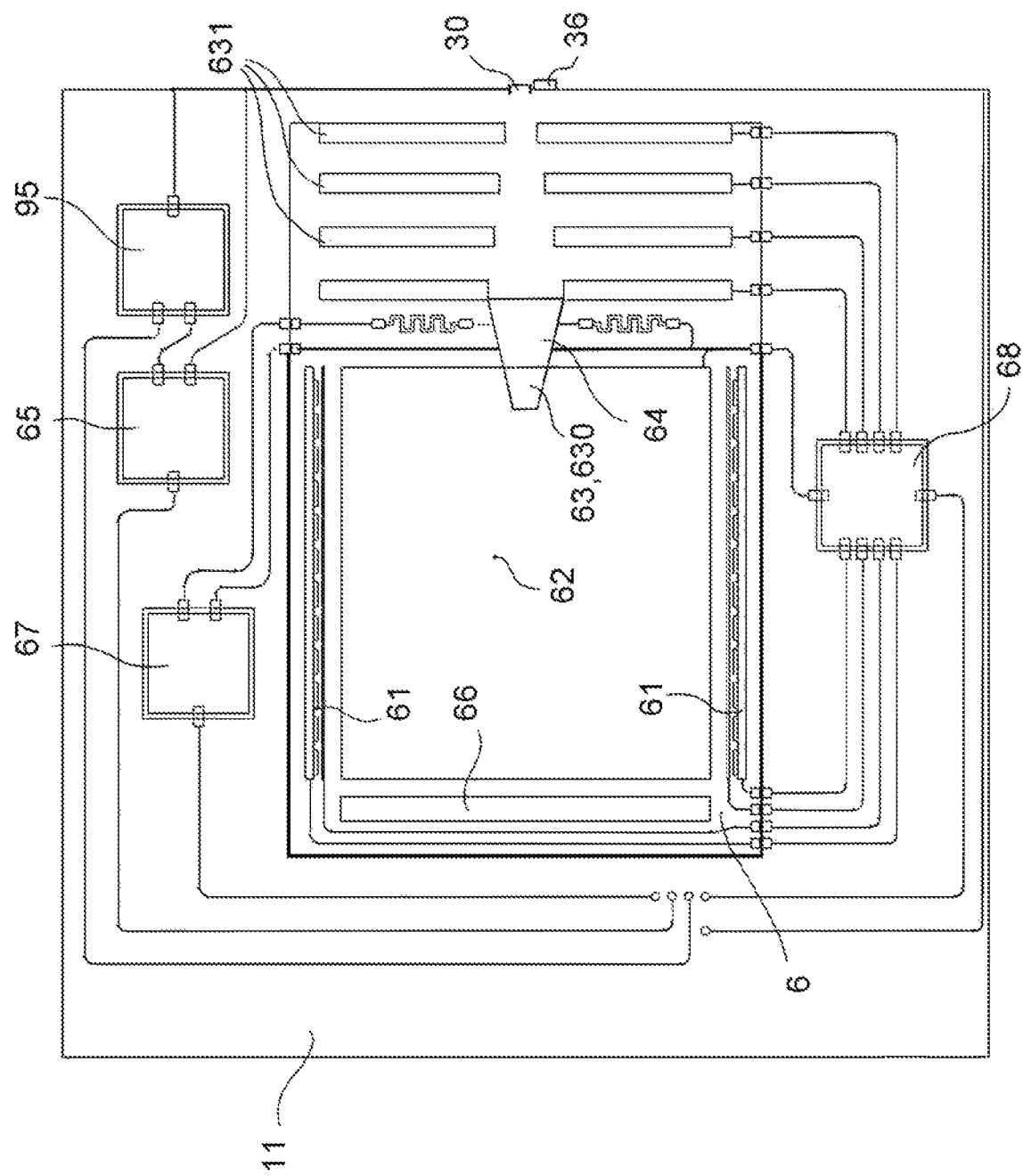
Figure 7:
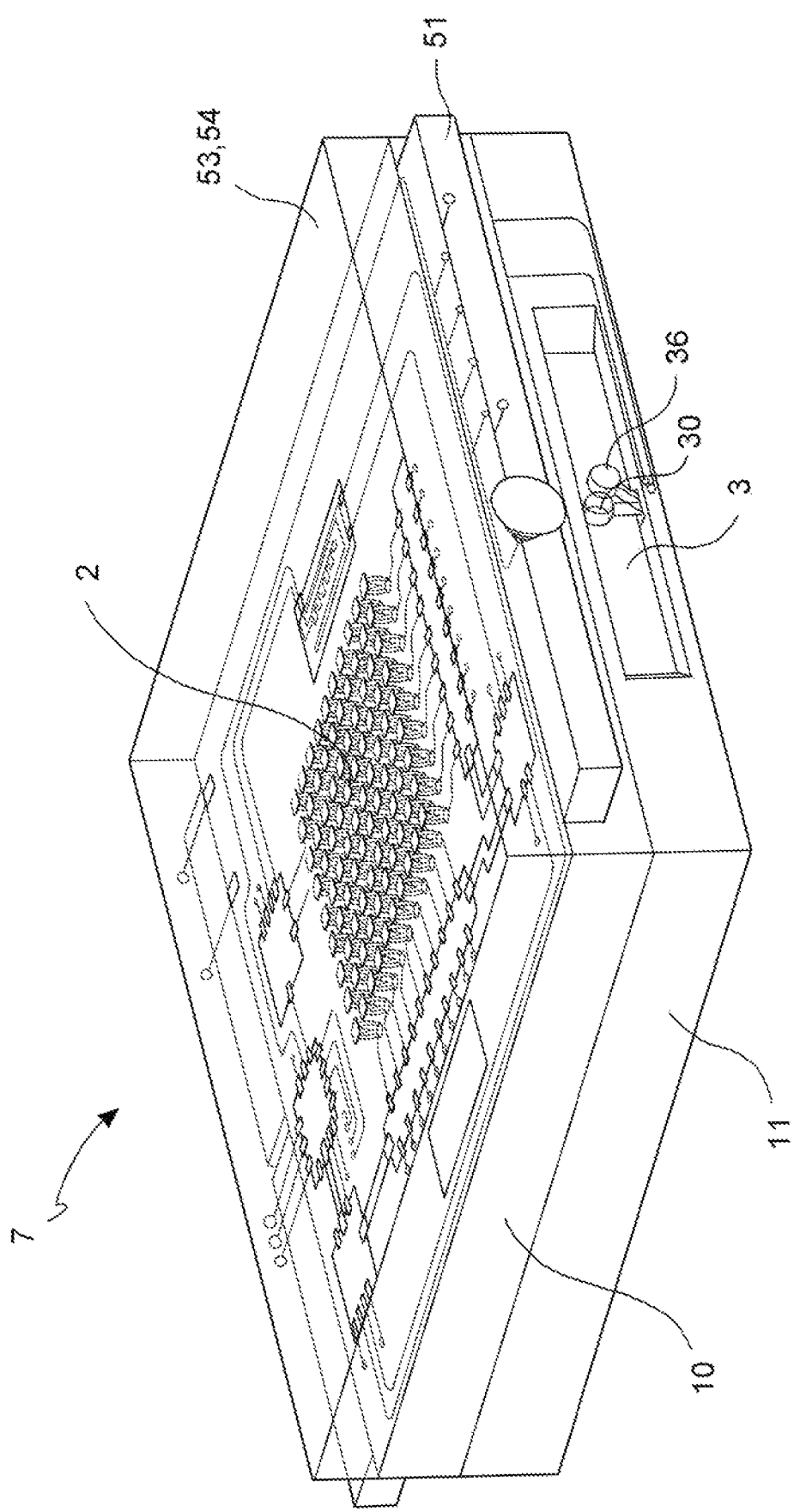
FIG. 7 is a perspective view of such a sampling module.

Now the outlet member 3, visible for example in FIGS. 6 and 7, is considered.

In an implementation example, the outlet member 3 is further configured to control and/or modulate over time the intensity of the output ion flow I.

For this reason, the movement of the shutter 36 can be controlled electro-mechanically, by the control means 40, so that the shutter 36 takes an opening position, in which it keeps fully open the orifice 30, or a closure position, in which it keeps the orifice 30 hermetically closed, or a plurality of intermediate positions, which determine a corresponding plurality of conditions for the opening or partial occlusion of the orifice 30.

In addition, it is also possible to drive the shutter 36 with a periodic opening/closing cycle according to a desired duty cycle.

In the example illustrated in FIG. 7, the shutter 36 has a pendulum shape.

According to an implementation option, the outlet actuation means 35 are configured to control the output gas flow Fo through an adjustment of the size of the opening of the orifice 30, and to control the modulation of the outlet ion flow I through an adjustment of the duration of closing and opening periods of the orifice 30, or of an opening/closing cycle time of the orifice 30.

Furthermore, the outlet actuation means 35 are also configured to contribute to control the pressure in the ionization chamber 6 by adjusting the duration of closure and opening periods of the orifice 30, or a closure/opening cycle time of the orifice 30.

According to a particular implementation example, the control means 40 are configured to control the intensity of the outlet ion flow I by acting on the pressure in the ionization chamber and/or on the generation of electrons by the ionization source 61.

According to another implementation example, the at least one outlet member 3 is further configured to measure the intensity of the outlet ion flow I. For this purpose, the shutter 36 can be equipped with a meter of the intensity of the ion beam, or be part of such intensity meter.

With reference now to FIG. 6, further details regarding the ionization chamber 6 of the system 1 will be illustrated.

In an embodiment, the ionization chamber 6 comprises ionization chamber control means 65, and at least one ionization source 61.

The ionization chamber 6 then comprises an ionization region 62, containing gas particles entering through the adjusting interface 22, and is arranged so as to be crossed by electrons generated by the ionization source 61, so that the ionization electrons ionize the gas particles (i.e., gaseous molecules), thus generating respective ions (i.e., ionized molecules).

The ionization chamber 6 also comprises first ion extraction means 63, configured to determine a preferred trajectory for the generated ions, passing through at least one first ion extraction window 64, through which the ions exit the ionization region 62, and to subsequently guide the ions toward the outlet member 3. For this purpose, the ions extraction means 63 comprise generators of time- and spatially-controlled electric and/or magnetic field.

The ionization source 61 may be an electron emission source, in itself known, such as, for example, an EI (Electron Ionization) source, in particular a field-effect "cold" emission source, such as a nano-tube source or plasma source, or by means of laser ionization.

According to an implementation example illustrated in FIG. 6, the ion extracting means 63 comprise at least one extractor and/or an ion guide 630, in itself known, to extract the ions from the ionization region 62; and further comprise at least one electrostatic lens 631, configured to define a path for the ions from the ion extraction window 64 to the orifice 30 of the outlet member 3 and to generate a collimated ion beam I as output flow.

Considering now the sampling module, having the structural aspects described above, it is evident that the sampling module control means 40 can be configured, according to what has been previously illustrated, to achieve the functional purposes of the system.

In particular, the fact that both the inlet flow Fi and the outlet flow Fo are at a molecular or predominantly molecular regime, causes that the partial gaseous concentrations, in the ionization chamber 6, reproduce the partial gaseous concentrations that are present in an external environment A to which the at least one inlet member 2 is exposed; and, therefore, the partial ion concentrations, in the output ion flow I, are deterministically representative of such partial gaseous concentrations. In particular, in the case in which the ionization cross sections of the different gas particles are equal or very similar, the partial ion concentrations exactly reproduce the partial gaseous concentrations. If the ionization cross sections are different, they are still deterministically known with great accuracy, whereby the partial ion concentrations may be related, again in a deterministic and precise manner, to the partial gaseous concentrations.

According to a particular implementation option, the sampling module control means 40 are also configured to vary, in a controlled manner, the ionization pressure Pi in the ionization chamber 6, by means of a suitable actuation of the at least one outlet member 3, so as to increase the ionization pressure Pi, based on the input flows, the volume of the ionization chamber, and an effective conductance of the output orifice (starting from a zero value up to a maximum value), which in turn depends on the opening/closing actuation periods of the at least one outlet member 3.

In such an option, advantageously, it is possible to "enrich" the gaseous mixture in the ionization chamber, while remaining in the pressure conditions that allow ionization. Consequently, one can increase the intensity of the ion flow I, and thus of the subsequent homogeneous ion beams I', and thus increase the signal-to-noise ratio of the electrical output signal S and, ultimately, improve the analysis accuracy and sensitivity of the system. A further improvement effect of such signal-to-noise ratio can derive from the possibility to modulate the intensity of the ion flow I with a suitable modulation frequency or "duty cycle".

Figure 8:
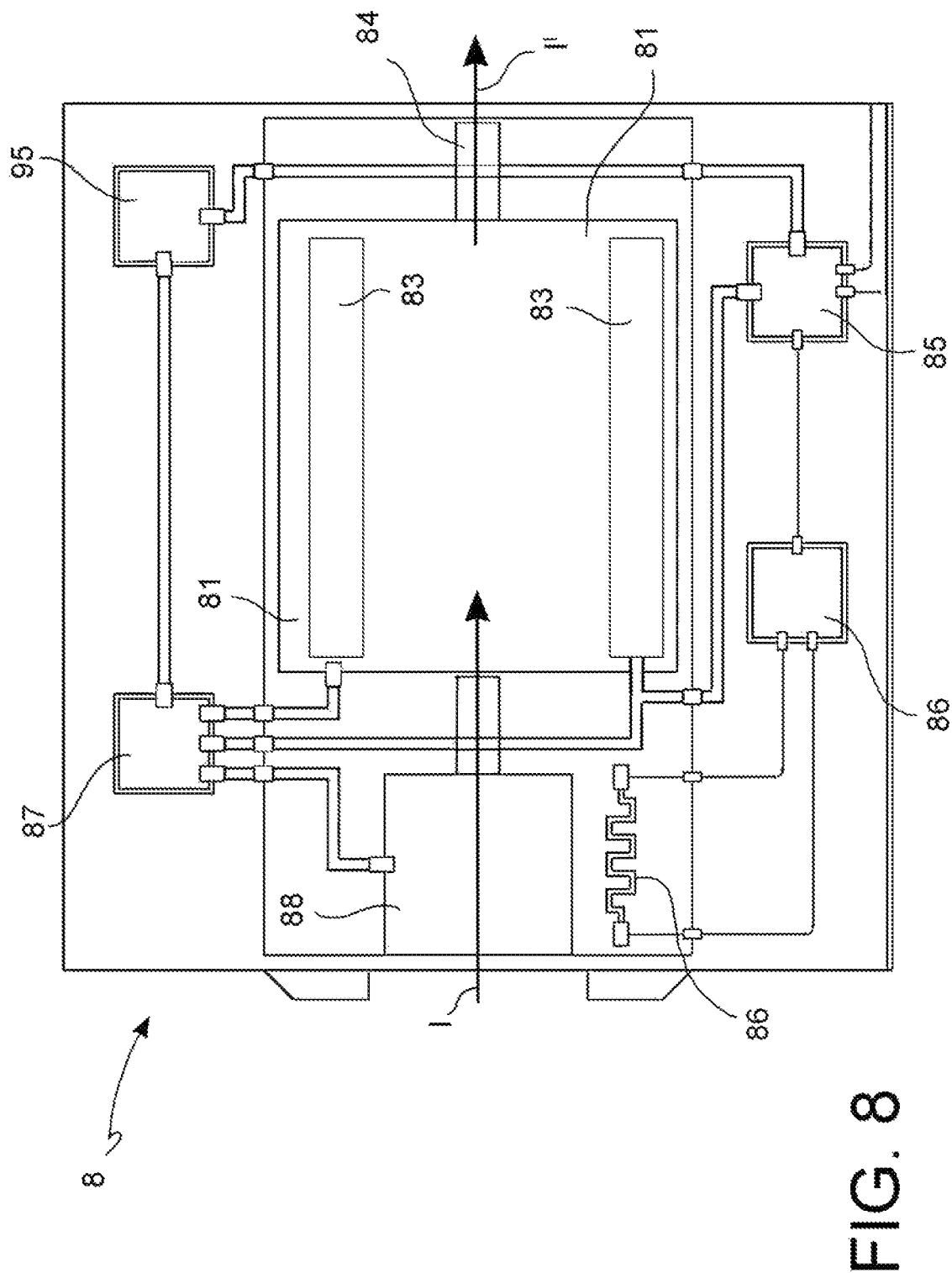
FIG. 8 presents a structural diagram of an ion filtering module comprised in an embodiment of the system.

With reference now to FIG. 8, the filtering module 8 is considered.

According to an embodiment, the ion filtering module 8 comprises a filtering region 81, through which the ion beam I passes in order to be filtered. The filtering region 81 comprises at least a second ion extraction window 84, through which the at least one homogeneous ion beam I' exits the filtering region 81 and the ion filtering module 8.

The ion filtering module 8 further comprises at least one electric and/or magnetic field generator 83, configured to generate in the filtering region 8 an electric and/or magnetic field and/or potential, with an amplitude and/or frequency and/or spatial pattern that is variable in a controlled manner; and also comprises filtering module control means 85, configured to control the electric and/or magnetic field and/or potential in amplitude and/or frequency and/or spatial pattern, so as to control a trajectory or a filtering region 81 passing-through speed, for the ions of the ion flow I, as a function of the respective mass thereof.

According to an implementation example, the ion flow I comprises a plurality of ions of different type, having different respective masses, and the filtering module control means 85 are configured to select a type of ion by determining a crossing trajectory passing through the second extraction window 84, for particles having a mass equal to that of the selected ion type, and a crossing trajectory not passing through the second extraction window 84, for particles having a different mass than that of the selected ion type.

According to another implementation example, the ion flow I comprises a plurality of ions of different types, having respective different masses, and the filtering module control means 85 are configured to select one type of ion by determining a pass-through speed for particles having a mass equal to that of the type of ion selected, for which such particles arrive at the second extraction window 84 while it is open, and instead a different pass-through speed, for particles having a mass different than that of the type of ion selected, for which such particles arrive at the second extraction window 84 while it is closed (wherein the extraction window 84 can be implemented by means of a shutter or by electro-static means).

According to an implementation option, the ion flow I comprises a plurality of ions of different type, having corresponding different masses, and the filtering module control means 85 are configured to extract sequentially over time ions of different type, thus generating a tuneable scanning of respective homogeneous ions beams I'.

According to an implementation example, the filtering module 8 also comprises a first achromatic ion guide 88 configured to guide the received ion flow I in the filtering region 81.

In an embodiment, the ion filtering module 8 comprises a miniaturized mass filter 81, 83.

This mass filter 81, 83 can be realised, for example, by a single quadrupole mass filter, or a multiple quadrupole mass filter with quadrupoles coupled in different combinations, or a magnetic sector, in itself known.

In another embodiment, the ion filtering module 8 comprises an RF cyclotron filter or a "time of flight" (TOF) mass filter.

According to another implementation option, not shown in the figures, the filtering module 8 also comprises a further filtering member configured to form a chemical reaction cell, so as to distinguish ions of different chemical substances having an equivalent or similar mass.

In an implementation example, the chemical reaction cell is realized in correspondence of the above-mentioned achromatic ion guide 88.

Such an additional filter element can be arranged, for example, upstream of the filtering region 81.

In an implementation example, the device 1 also comprises members for ion flow monitoring before the entrance and after the exit of the filtering region 81.

In the example illustrated in FIG. 8, the filtering module further comprises a power supply 87, a heater 86 and a pumping member of the pumping means 95.

It should be noted that, in the case of an application of the system for gas chromatographic analysis, the flow output from the gas chromatographic column, and consequently the inlet gaseous flow Fi in the sampling module 7, shows a time sequence of concentration peaks, each corresponding to a respective particle of the gaseous flow to be analyzed, together with additional carrier gaseous particles of the gas chromatographic column (for example, He, Ar, or $H_2$). In this case, the filtering module control means 85 are configured to shield the further carrier gaseous particles, and to extract from the second extraction window 84, at a given instant, the ions corresponding to the respective particle of the gaseous flow to be analyzed.

It should be noted that, due to the structure of the system 1 described here, the filtering and detection time periods are typically lower with respect to the time intervals elapsing between one intensity peak and another, at the exit of the gas chromatographic column.

This fact, advantageously, allows the system 1 to perform a sequential analysis, virtually in real time, of the output flow from the gas chromatographic column, and thus of the gaseous composition to be analyzed.

Furthermore, the above properties of the system 1 according to the invention enables the convenient possibility to simultaneously interface this system with a plurality of gas chromatographic columns, as will be better illustrated below.

Figure 9:
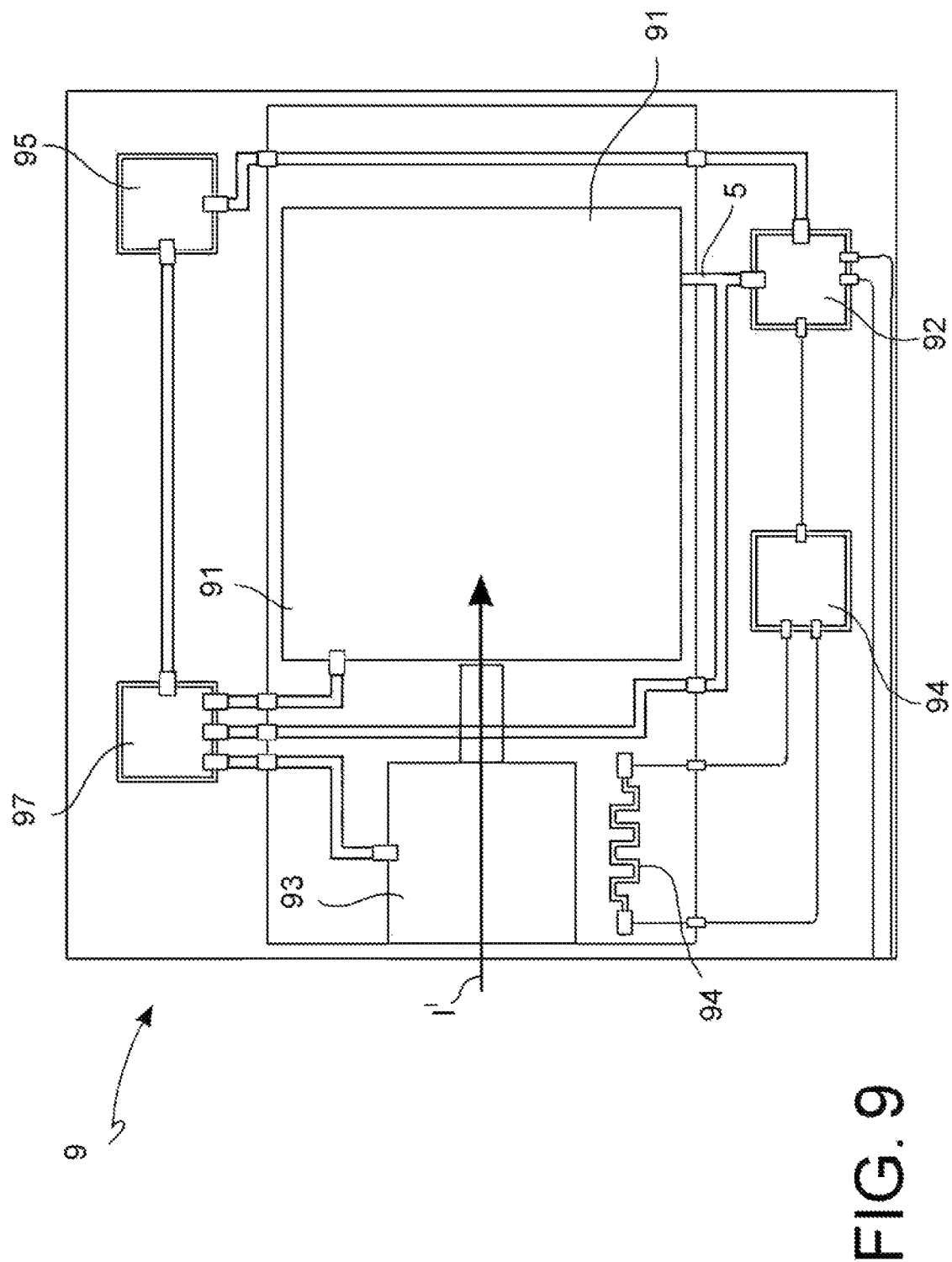
FIG. 9 presents a structural diagram of an ion detection module comprised in an embodiment of the system.
Figure 10:
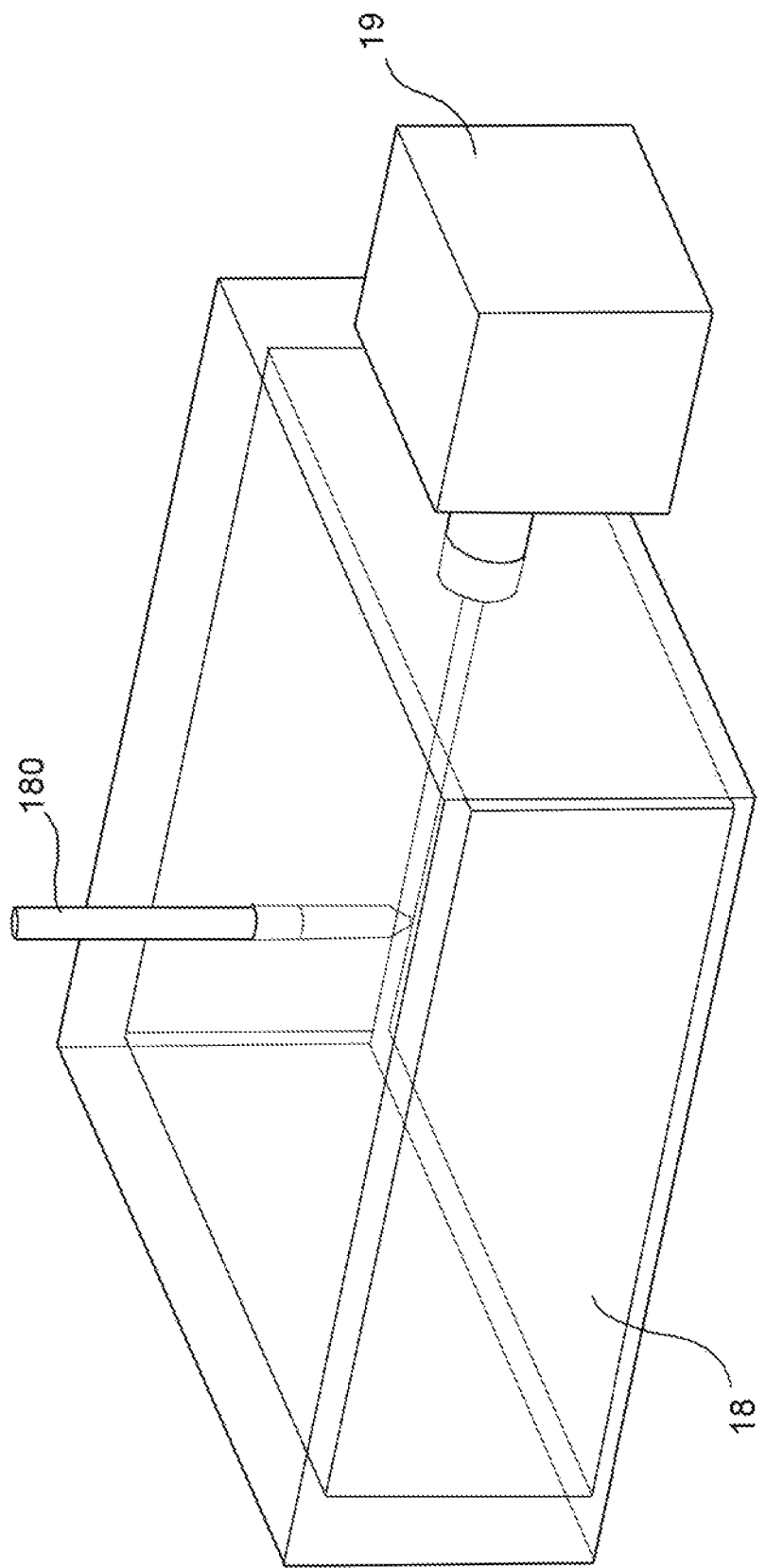
FIG. 10 is a perspective view of a sampling chamber in an embodiment of the system.

With reference now to FIG. 9, the ion detecting module 9 is considered.

According to an embodiment, the ion detecting module 9 comprises detecting module control means 92, and also one or more detectors 91, each configured to generate an electrical signal S proportional to the intensity of the ion beam I' incident to it.

According to various implementation options, each detector 91 is implemented by a Faraday Cup, or a discrete-dynode SEM (Second Electron Multiplier), or by a continuous-dynode Channeltron or a detector with high-voltage sensors, in themselves known.

According to an embodiment example, the ion detecting module 9 comprises a second achromatic ion guide 93 configured to guide the received one or more ion beams I' towards a respective detector 91.

In an implementation example, such a second achromatic ion guide 93 can be configured to serve as a further chemical reaction cell.

In the example illustrated in FIG. 9, the ion detecting module further comprises a power supply 97, a heater 94 and a pumping member of the pumping means 95.

With reference now to further structural and functional aspects of the system, shown in FIGS. 1 and 10-16, the following aspects should be noted.

According to an embodiment, the system 1 also comprises processing means 4, such as a processor 4, operatively connected with the sampling module 7, the ion filtering module 8, the ion detecting module 9 and the pumping means 95.

The processing means 4 are configured to control the sampling module control means 40, the ionization chamber control means 65, the ion filtering module control means 85, the ion detecting module control means 92 and the pumping control means.

Furthermore, the processing means 4 are configured to receive from the ion detecting module 9 the one or more electrical signals S representative of the gaseous concentrations, and to make the related results available.

According to a further embodiment (illustrated in FIG. 5), the system 1 also comprises at least one sampling pressure sensor 50, arranged in the sampling chamber 18 (for example, installed in the outlet member 2 of the sampling module 7) and configured to measure the sampling pressure Pc. The system 1 also comprises at least one further detection pressure sensor, configured to measure the ionization pressure Pi.

According to an implementation option, the system 1 comprises a plurality of internal pressure sensors, configured to detect respective pressure values within the sampling module 7, the filtering module 8 and the ion detecting module 9, respectively.

According to an embodiment, the system 1 also comprises an input/output interface 51, operatively connected to the electronic processing means 4, and configured to send outside the system, or to receive from outside the system, control, and/or monitoring, and/or calibration and/or diagnostic signals.

In various implementation examples comprised in the invention, the electronic processing means 4 are configured to control the functions of the system on the basis of control signals coming from outside the device via the input/output interface 51, and/or on the basis of the pressure values measured by the miniaturized pressure sensors and/or of the current of the beam measured or of the measured mass spectrum.

In a further implementation example, the system 1 is configured to calibrate the results of the analysis on the basis of a comparison with reference results, obtainable by arranging the device 1, through a second inlet member, in communication with a further environment in which a known gaseous composition is present.

Advantageously, the adjustment or calibration procedure is carried out while the system is in operating conditions and does not interfere with the results of the analysis performed by the system.

In another implementation example, the system 1 is configured to perform parallel analysis of several different environments, by providing further respective inlet members facing such environments.

Optionally, the system 1 also comprises a reference pressure sensor (not shown in the figures), encapsulated in a sealed and/or openable environment, and configured to provide a reference signal to the processing means 4 for calibration and/or diagnostic functions of the device.

According to an implementation example, the system 1 also comprises a power supply interface 55 (illustrated in FIG. 5).

According to an implementation example, the system 1 also comprises an electric power supply 68 for the ionization chamber (illustrated in FIG. 6).

The system 1 may also comprise controlled heating means, configured to maintain a desired temperature, under the control of the processing means 4.

In particular, according to an implementation option, the controlled heating means comprise at least one first heater 52 in the adjusting interface 22, at least one second heater 62 in the sampling module 7, at least a third heater 86 in the ion filtering module 8 and at least one fourth heater 94 in the ion detecting module 9.

According to a further implementation example, the system 1 also comprises particulate filtering means 53, arranged so as to cover the entire device (for example, equipped with filters with micro-metric frames).

Furthermore, the device 1 may comprise thin protection films, configured to reduce the adsorption of process gas (for example, hydrophobic films to prevent the adsorption of moisture present in the process environment) and prevent corrosion.

It should be noted that the electronic processing means 4 can be configured to perform a diagnostic procedure of the system 1, on the basis of a processing of the data received from the pressure sensors, and/or measurement data of the intensity of the ion beam and/or stored data relating to nominal predetermined operating conditions or operating environmental conditions of the system, so as to identify possible operating anomalies of the system.

Moreover, the electronic processing means 4 are configured to perform, if the diagnostic procedure gives a negative result, a procedure for an adjustment and/or compensation and/or optimization of the system, by acting on the operating parameters of the system to correct and/or compensate for the identified operating anomalies, based on the results of the aforesaid diagnostic procedure.

With reference now to aspects of structural implementation (illustrated for example in FIGS. 11-16), it should be noted that, in an embodiment, the system 1 comprises a sampling member 17, in which the sampling chamber 18 and the first pumping means 19 are implemented. The system 1 also comprises an interface and control chip 10, in which at least the adjusting interface 22 and the first actuating means 25 of the sampling module 7 and the electronic processing means 4 are implemented. The system 1 then comprises at least one processing chip, in which the ionization chamber 6, the ion outlet member 3, and the second actuating means 35, of the sampling module 7, and further the ion filtering module 8, the ion detecting module 9 and the second pumping means 95 are implemented.

Figure 11:
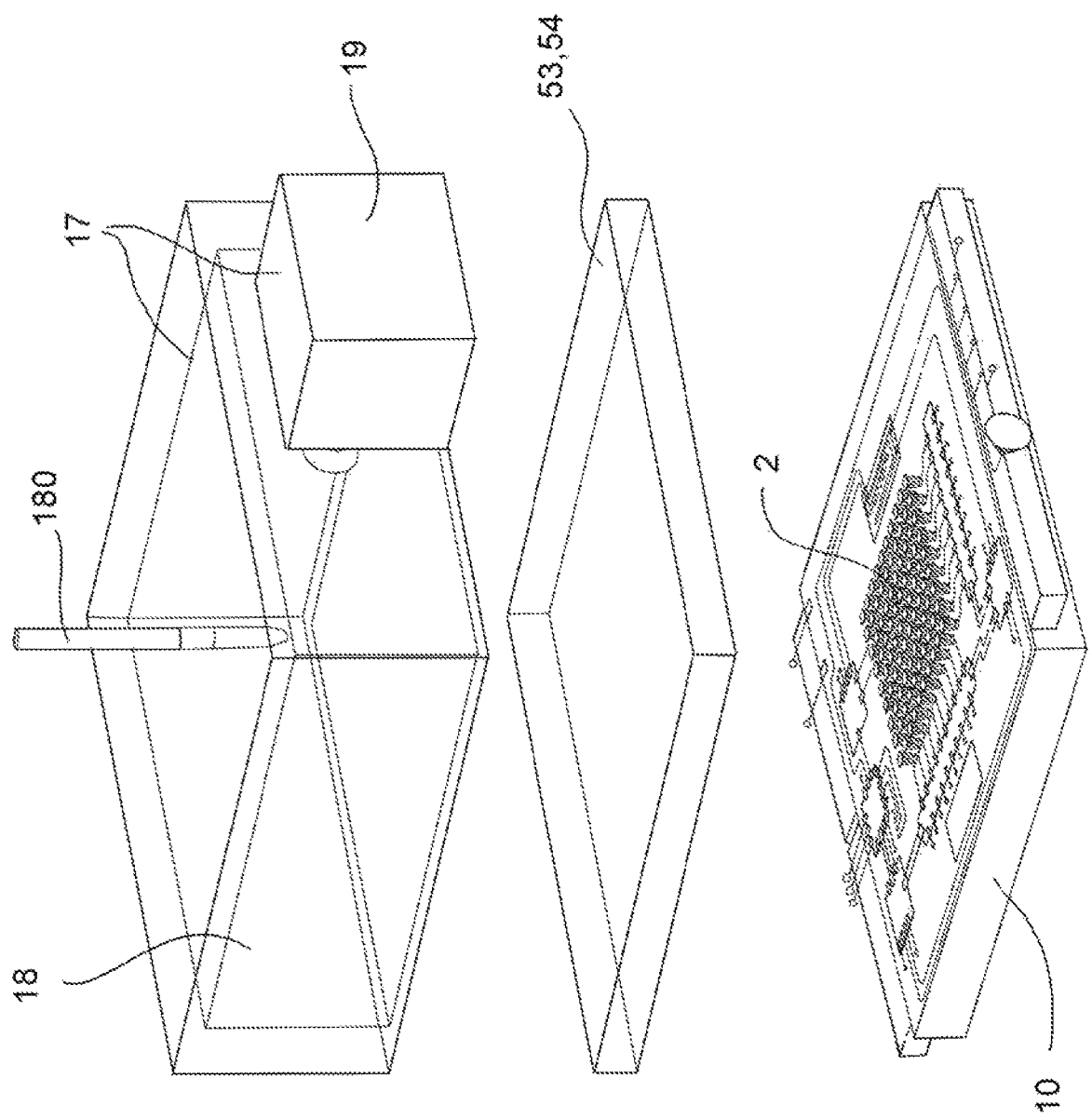
FIG. 11 is an exploded perspective view of a sampling chamber and a portion of sampling module comprised in an embodiment of the system.

In this case, as illustrated in FIG. 11, the sampling member 11 is fluidically and operatively connected with the interface and control chip 10; for example, the sampling member 17 contains a sampling chamber without "floor"; the edges of the sampling member 17 are suitable to be connected, vacuum-sealed, with the interface and control chip 10, which, in turn, is overlapped to the at least one processing chip, so that the respective portions of the sampling module 7 are in correspondence with each other.

Figure 12:
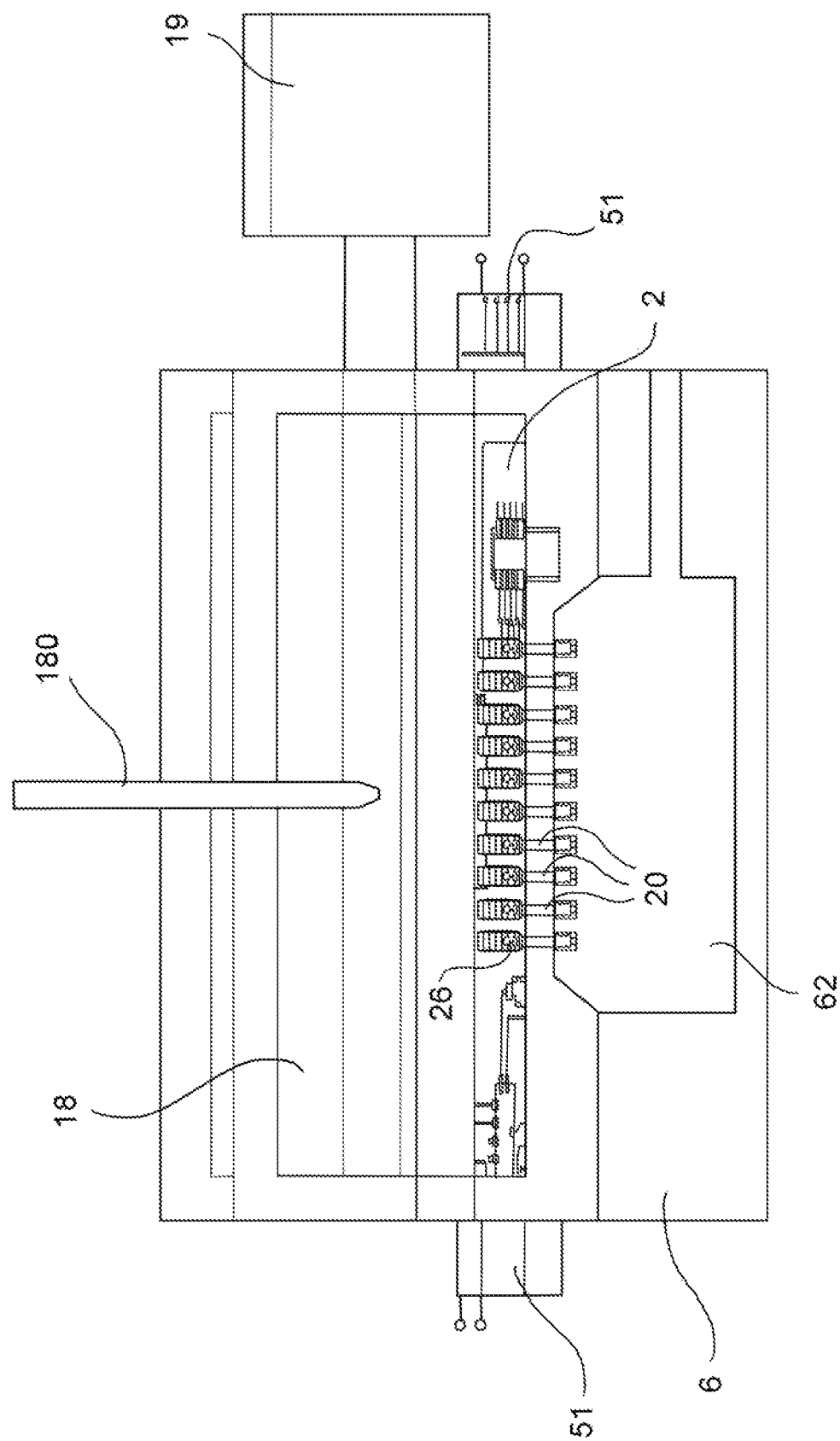
FIG. 12 illustrates a side sectional view of a sampling chamber and a further portion of sampling module comprised in an embodiment of the system.
Figure 13:
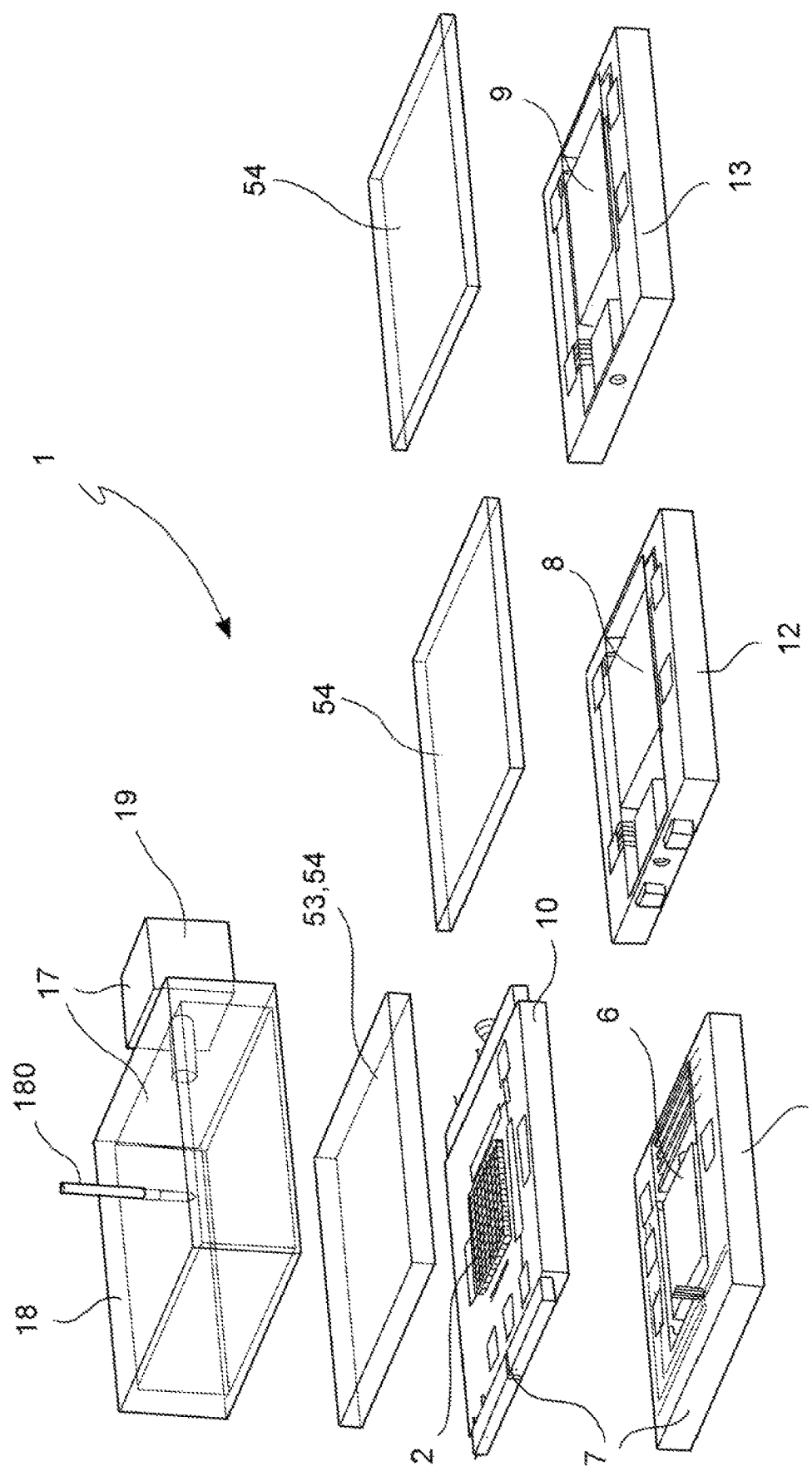
FIGS. 13 and 14 illustrate an exploded and perspective view, respectively, of an embodiment of the system.
Figure 14:
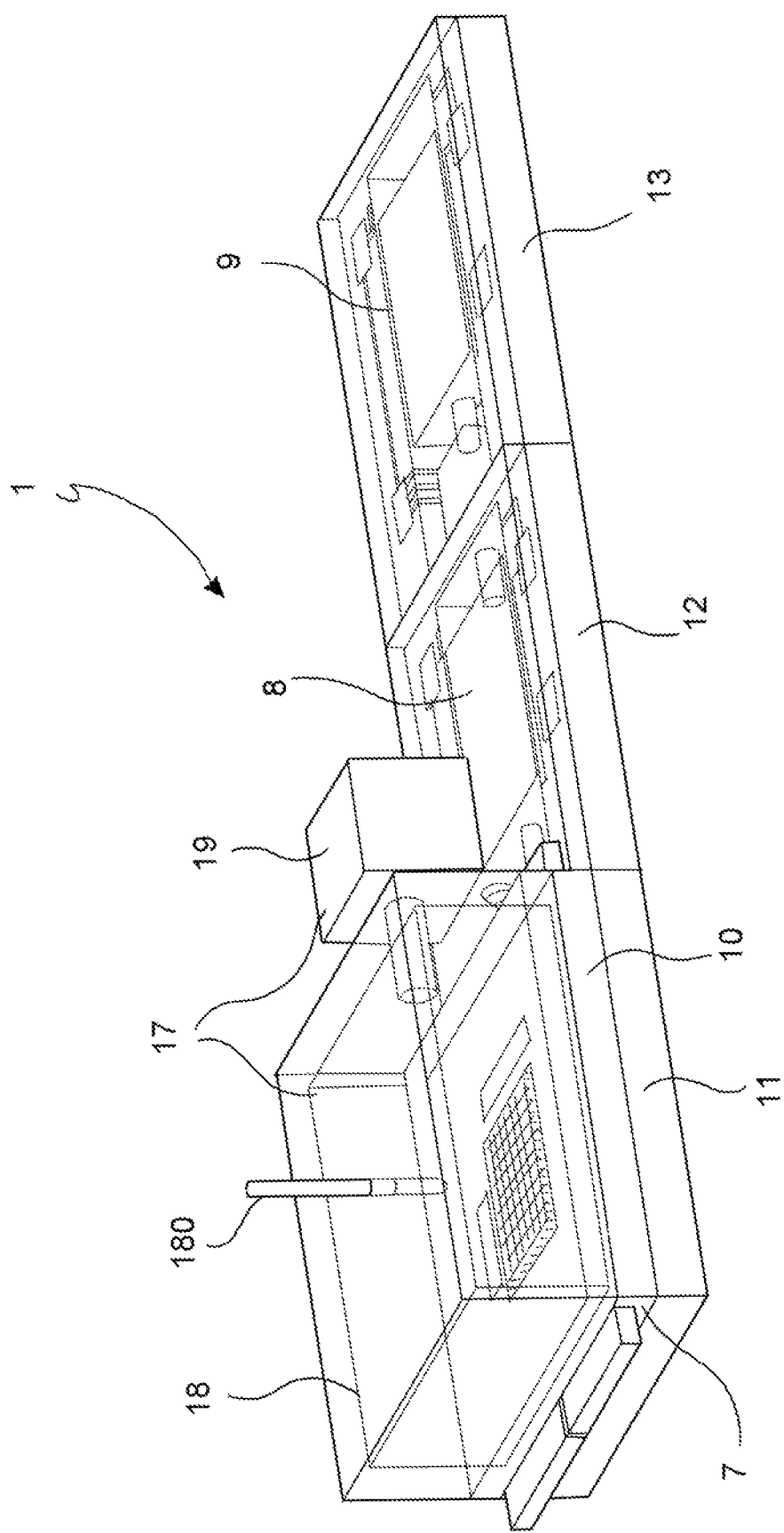

In this way, as illustrated in FIG. 12, the interface and control chip 10 is interposed between the sampling member 17 and the at least one processing chip 11, so that the fluidic communication between the sampling chamber 18 and the ionization region 6 can take place solely through the flow adjusting interface 22.

In the embodiment described here the sampling member 17, the interface and control chip 10, and the at least one processing chip are connected so as to ensure a vacuum seal and to implement a single integrated device therewith.

In the embodiments illustrated in FIGS. 13-16, the system 1 comprises, in particular, three processing chips 11, 12, 13.

The ionization chamber 6, the ion outlet member 3, and the second actuating means 35, of the sampling module 7 are implemented in the first processing chip 11. The ion filtering module 8 is implemented in the second processing chip 12. The ion detecting module 9 and the pumping means 95 are implemented in the third processing chip 13.

The three processing chips 11, 12, 13 are mutually connected in a vacuum sealed manner, so as to allow a passage of ions from the ion outlet member 3 of the sampling module 7 to the filtering region 81 of the ion filtering module 8 through to the at least one detector 91 of the ion detecting module 9.

According to an implementation option, each of the processing chips 11, 12, 13 comprises a vacuum-proof covering member 54.

Figure 15:
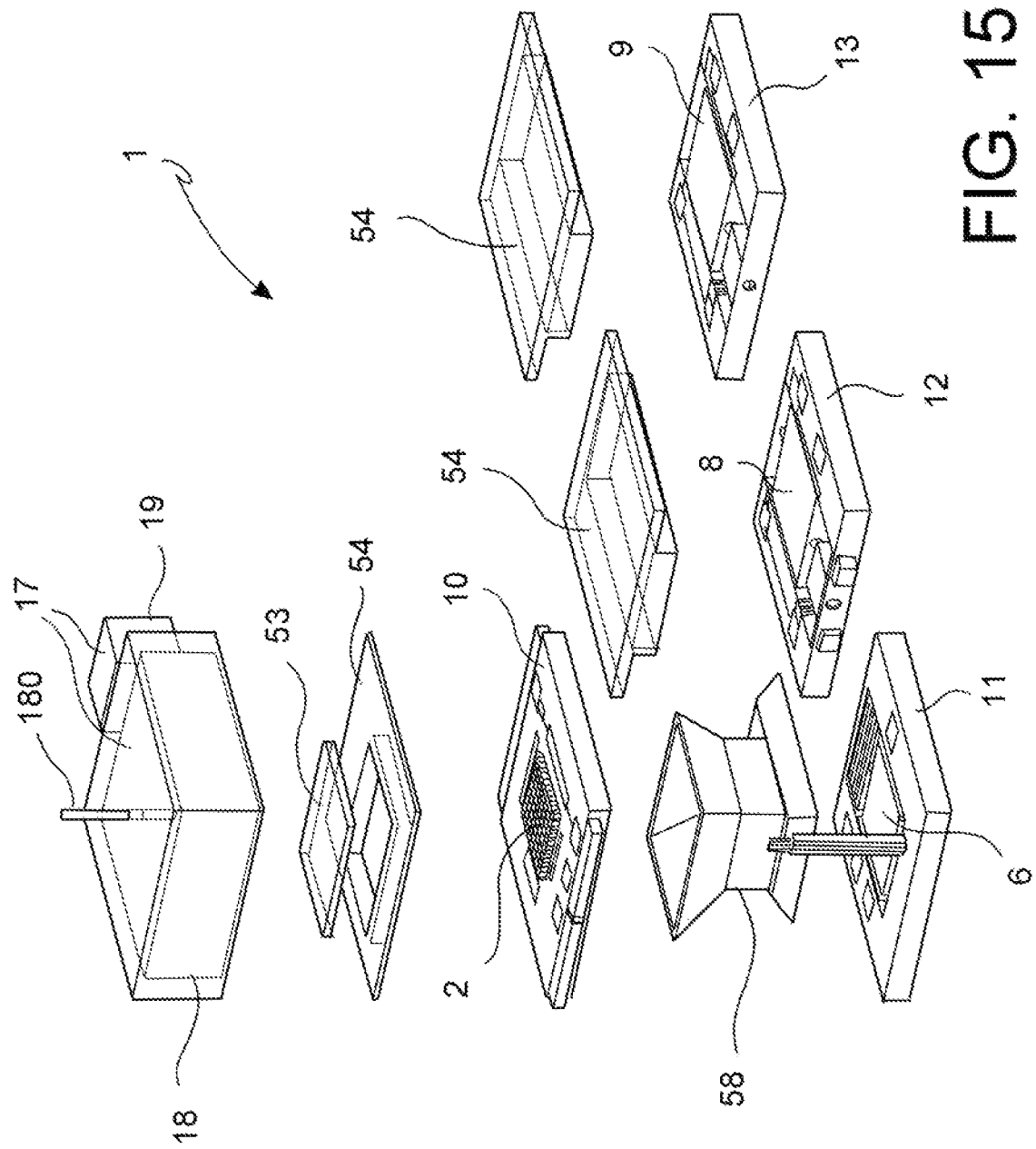
FIGS. 15 and 16 illustrate an exploded and perspective view, respectively, of a further embodiment of the system.
Figure 16:
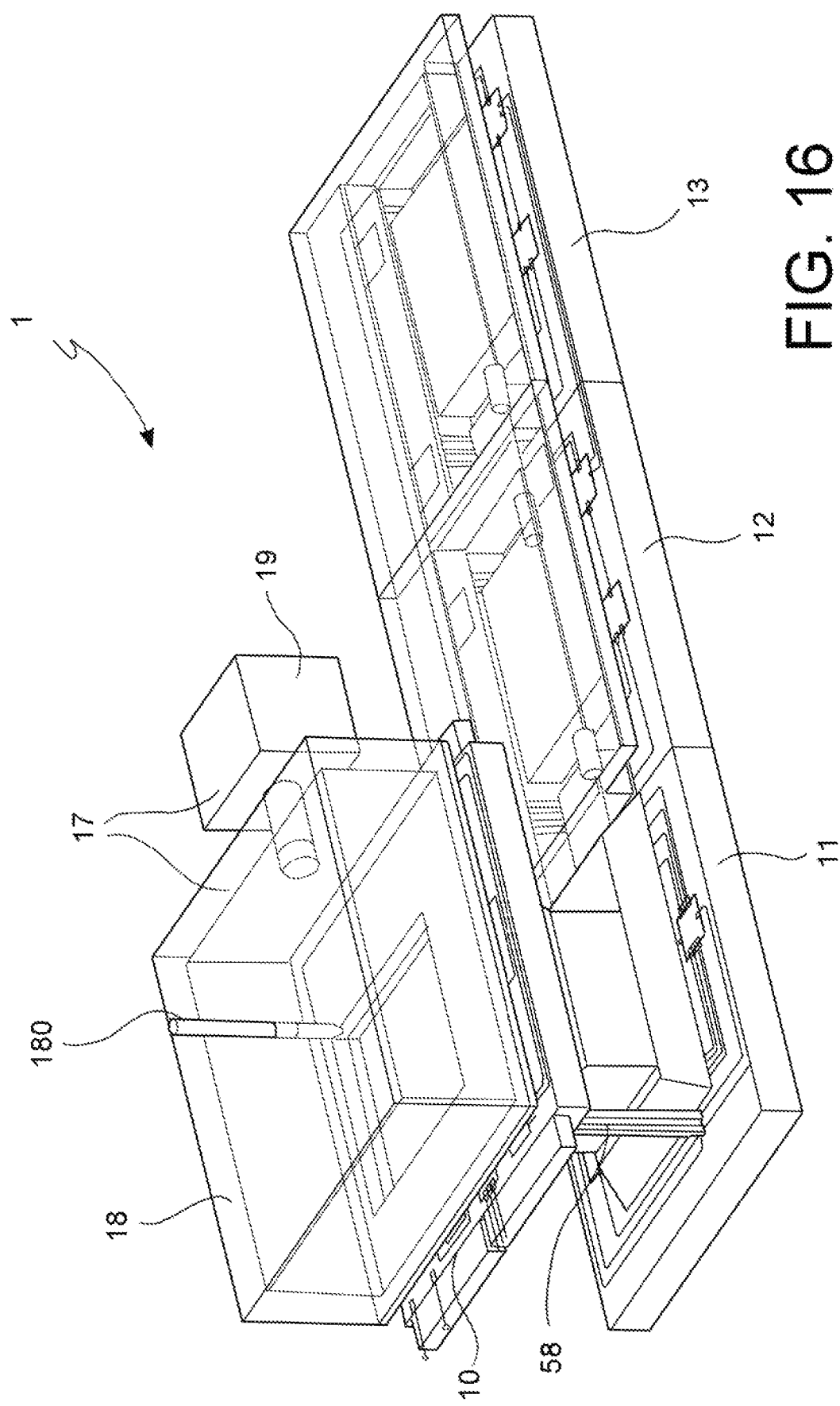

According to an embodiment, illustrated in FIGS. 15 and 16, the system 1 further comprises a miniaturized connector member 58, integrated in the system 1, and configured to physically separate the interface and control chip 10 from the at least one processing chip 11, while, at the same time, allowing an operative connection between them.

Below, apparatuses comprised in the invention will be described.

Figure 17:
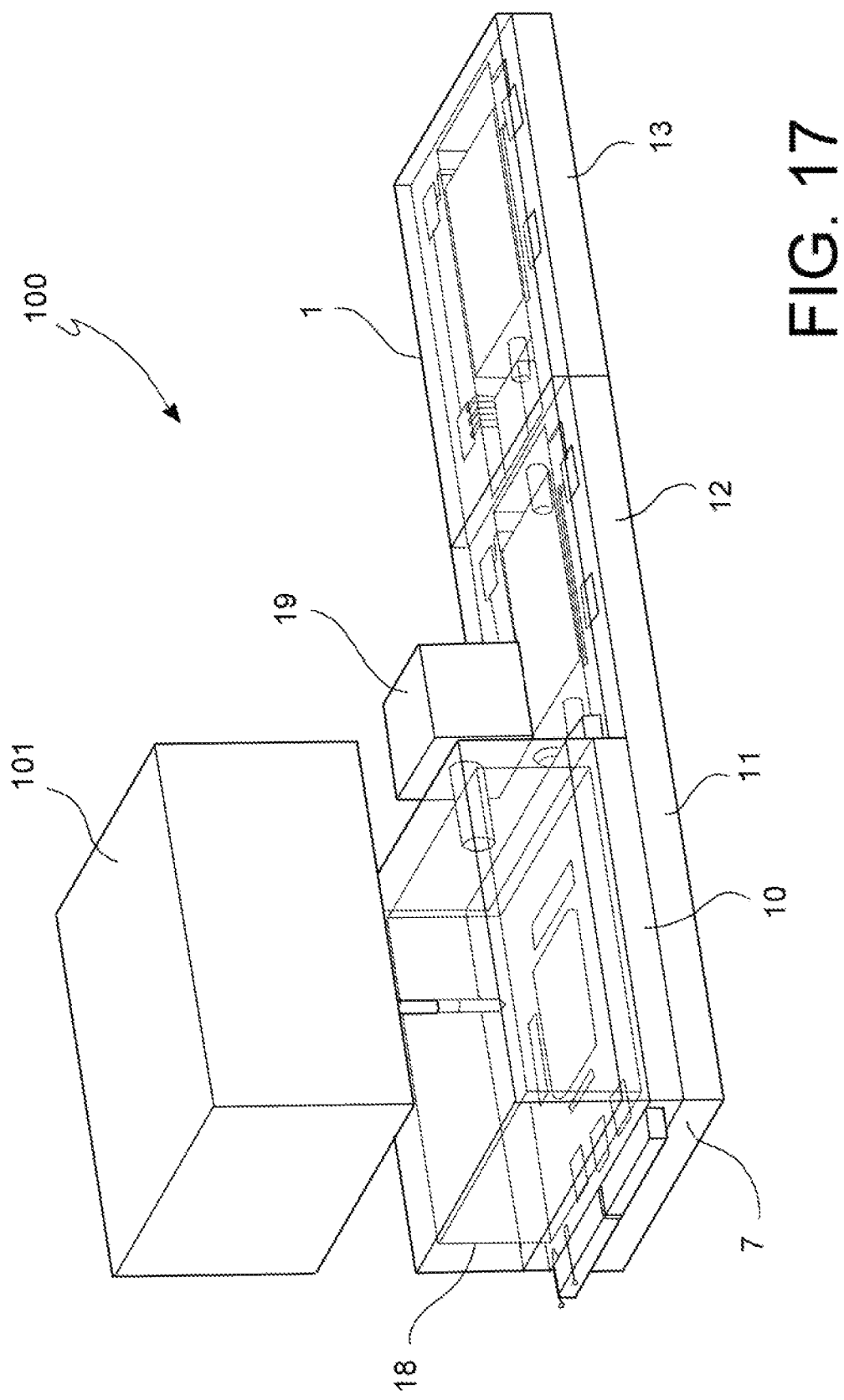
FIG. 17 is a perspective view of an embodiment of an apparatus according to the invention.

The invention comprises a gas-chromatographic analysis apparatus 100 (illustrated in FIG. 17), comprising a gas chromatographic column 101, and a system 1 for the analysis of gaseous flows according to any of the embodiments described above.

Figure 18:
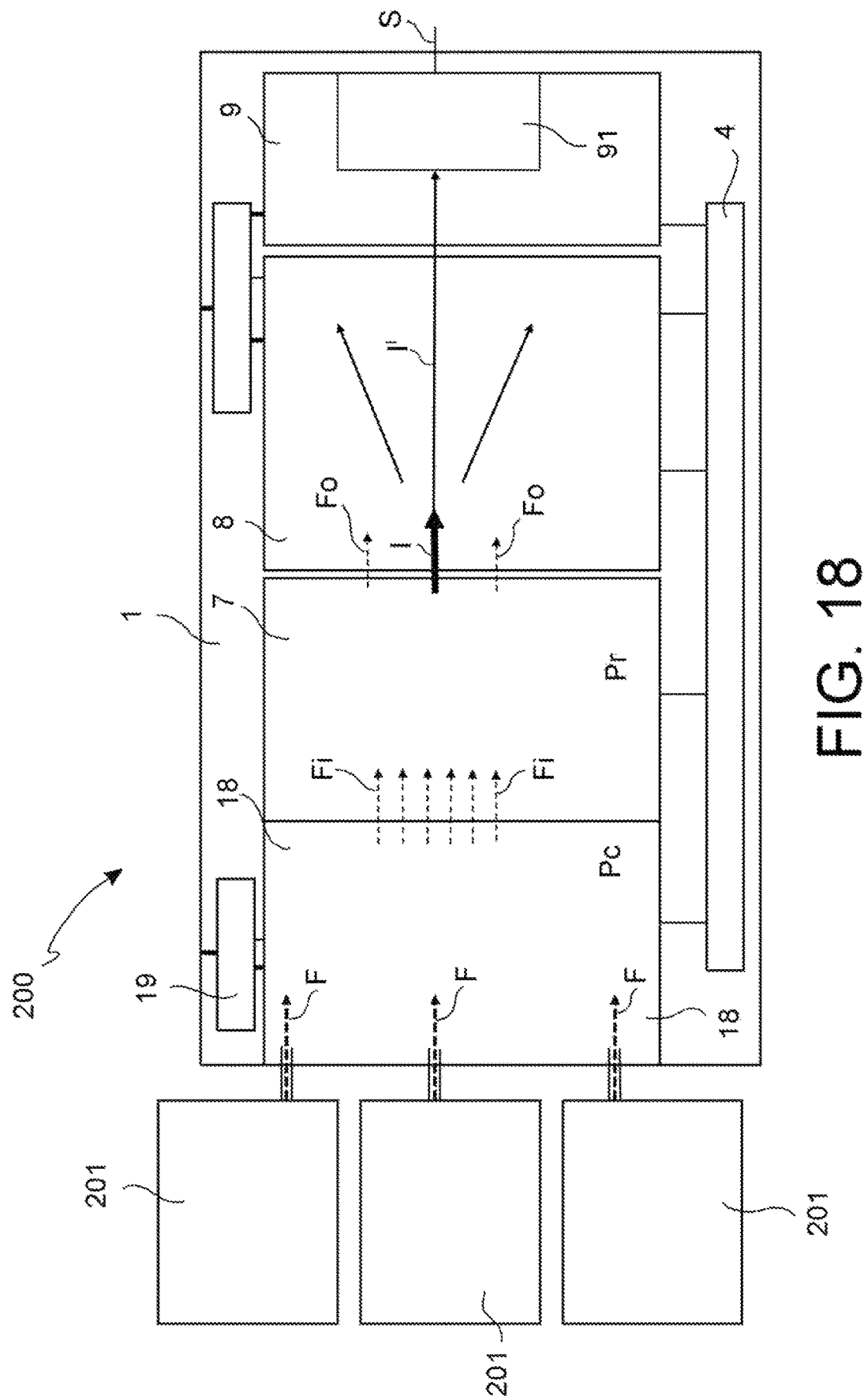
FIG. 18 represents a schematic diagram of a further embodiment of an apparatus according to the invention.

The invention likewise comprises a gas-chromatographic analysis apparatus 200 (illustrated in FIG. 18), comprising a plurality of gas chromatographic columns 201, and a system 1 for the analysis of gaseous flows according to any of the embodiments described above.

In fact, due to its structure described above, the system 1 of the invention is able to interoperate with multiple gas chromatographic columns simultaneously, and to analyze their flow intensity peaks as they arrive.

More particularly, in the case where a plurality of N gas chromatographic columns are connected to respective inlets of the system 1, each with its own conductance, the total flow entering the sampling chamber 18 is the sum of the flows output by the gas chromatographic columns; the total pressure in the sampling chamber 18 is substantially the sum of the pressures that one would have if each gas chromatographic column were acting individually. The presence of the adjusting interface 22, between the sampling chamber 18 and the sampling module 7, advantageously allows adjusting the micro-flows (for example, by dividing the conductance by a factor N, with respect to the case of a single gas chromatographic column), so as to maintain, in any case, the appropriate operating conditions in the sampling module 7. The first pumping means 19 then ensure control of the sampling pressure Pc, depending on the number and intensity of the incoming gas flows.

According to another implementation option, each inlet of the sampling chamber 18 is provided with a valve; thus the sampling chamber turns out to be a kind of three-way valve system. In this way, it is possible to selectively allow or inhibit the flow entering the sampling chamber coming from each of the gas chromatographic columns; consequently, it is possible to operate on the gas chromatographic columns in serial or parallel mode, or any desired combination of such modes.

According to another implementation option, the sampling chamber can be partitioned into several areas, isolated from each other, into which several gas chromatographic columns (or other sources of variable or known flows) inject their respective flows.

Below, methods comprised in the invention will be described.

The invention comprises a method for analyzing time-variable gaseous flows, by a portable analysis system 1.

The method comprises the steps of producing a controlled sampling pressure Pc in a sampling chamber 18 of the system 1; then, injecting into the sampling chamber 18 at least one gaseous flow F, having a gaseous composition to be analyzed, that is variable over time; furthermore, producing an ionization pressure Pi in a sampling module 7 of the system 1; then, adjusting an input gaseous flow Fi in the sampling module 7 from the sampling chamber 18 and an output gaseous flow Fo from the sampling module 7 in such a way that input gaseous flow Fi includes a plurality of micro-flows at a molecular or predominantly molecular regime, at the sampling pressure Pc, and the output gaseous flow Fo is a flow at a molecular or predominantly molecular regime, at the ionization pressure Pi, so that the gaseous composition in the sampling module 7 is representative of the gaseous composition to be analyzed.

The method then comprises the steps of ionizing the gas particles in the sampling module 7 and emitting the produced ions, so as to generate an ion flow I having an ion composition representative of the gaseous composition to be analyzed.

The method also comprises the steps of selecting, in a controllable manner by a filtering module 8 of the system 1, at least one type of ion that is present in said ion flow I, to generate a corresponding at least one homogeneous ion beam I', having an intensity representative of the concentration of the corresponding gas particle in the gaseous composition to be analyzed; then, extracting the at least one homogeneous ion beam I' from the ion filtering module 8, and measuring the intensity of the at least one ion beam I' by an ion detecting module 9 of the system 1, to generate a corresponding electric signal S representative of the concentration of the corresponding gas particle in the gaseous composition to be analyzed.

According to an example embodiment of the method, the sampling module 7, the filtering module 8 and the ion detecting module 9 are comprised in a single integrated device.

According to another embodiment example of the method, even the sampling chamber 18 is miniaturized and comprised is the above-mentioned integrated device.

According to an embodiment example, the above-mentioned step of injecting comprises injecting a gaseous flow Fi that is variable in intensity and composition over time, deriving from one or more gas chromatographic columns 101, 201, in which such gaseous flow comprises a plurality of gas particles to be analyzed and further gaseous carrier particles of the gas chromatographic column; and the step of selecting further comprises the step of shielding the gaseous carrier particles.

In accordance with another embodiment option, the above-mentioned step of injecting includes injecting a gaseous flow that has a sequence of intensity peaks, each corresponding to a respective particle of the gaseous flow to be analyzed; the step of extracting comprises extracting, at a given instant, the ions corresponding to the respective particle of the gaseous flow to be analyzed; the step of measuring comprises sequentially measuring the intensity of the ion beams (I') corresponding to the particles of the gaseous flow to be analyzed, according to the sequence of the input intensity peaks.

According to an implementation example, the ionization pressure Pi is a vacuum pressure.

According to other implementation examples, the sampling pressure Pc is kept constant at a level equal or similar to atmospheric pressure, or the sampling pressure Pc is varied in a controllable manner, depending on the input gaseous flow F.

According to an implementation option, the step of determining a sampling pressure Pc includes extracting gas from the sampling chamber 18, so as to control the sampling pressure Pc; and the step of producing an ionization pressure Pi includes extracting gas from the sampling module 7, so as to control said ionization pressure Pi.

According to an embodiment, the method of the invention operates with a constant sampling pressure and variable gaseous flows.

As can be seen, the object of this invention is achieved by the system described previously, by virtue of the characteristics illustrated.

From the above description, it is evident that the system of this invention is able to analyze a gaseous composition, that is variable over time, with great accuracy and, at the same time, can be built so as to be compact and portable, and even as an integrated and self-sufficient device.

In fact, thanks to its structure and functionality, such a system is able to operate with constant sampling pressures and variable flows. Not being required to operate with constant flows, the system does not need to be equipped with bulky and expensive flow meters/controllers.

Furthermore, the system allows operating starting from vacuum pressures, and adding, in a controlled way, gaseous micro-flows by injecting them into the sampling module from the sampling chamber. So, contrary to the prior art, there is no need to proceed to pumping gaseous macro-flows towards the outside to obtain the vacuum pressures necessary for ionization. Consequently, the ionization environment and the pumping means, as well as the other components of the system, can be easily miniaturized.

At last, the above-mentioned characteristics allow implementing the system in a much more compact and less expensive manner compared to the known solutions cited, and thus having a system that is portable and can be easily installed anywhere.

Moreover, due to the fact that, as described above, the gaseous flows entering and exiting from the ionization environment are kept at a molecular or predominantly molecular regime, the device allows reproducing the gaseous composition to be analyzed, with great fidelity, in the ionization environment. This feature allows considerably improving the accuracy and sensitivity of gaseous composition analysis.

In addition, by appropriately controlling the gaseous flows entering and exiting the ionization environment in the device, as described above, it is possible to enrich the density of gas particles in the ionization environment, while remaining at vacuum pressures compatible with ionization. This allows an improvement in the signal-to-noise ratio of the output signal, and therefore a further improvement of the sensitivity and accuracy of the system.

Finally, the calibration, diagnostic and self-adjustment procedures mentioned above, provide to the system a degree of self-sufficiency such as to make it versatile, reliable and suitable for a wide variety of uses.

Similar advantages can be identified in the gaseous composition analysis apparatuses and methods previously described.

To the embodiments of the system for analyzing time-variable gaseous composition, described above, and the related apparatuses and methods, a technician in the field, to satisfy contingent requirements, may make modifications, adaptations and replacements of members with others functionally equivalent, without departing from the scope of the following claims. Each of the characteristics described as belonging to a possible embodiment can be achieved independently from the other embodiments described. Also note that the term "comprising" does not exclude other elements or steps and the "a" or "one" does not exclude a plurality. Moreover, the figures are not necessarily to scale; on the contrary, importance is generally given to the illustration of the principles of this invention.

The invention claimed is:

1. A system for analyzing time-variable gaseous flows, the system being portable and comprising:
   a sampling chamber, suitable to be kept at a controlled sampling pressure (Pc), and configured to receive at least one gaseous flow (F) having a gaseous composition to be analyzed that is variable over time;
   a gas sampling module, in fluidic communication with the sampling chamber, configured to adjust, in a controllable manner, an input gaseous flow (Fi) of gas particles entering the gas sampling module, at said controlled sampling pressure (Pc), from the sampling chamber, and an output gaseous flow (Fo) from the gas sampling module, so as to reproduce inside the gas sampling module a gaseous composition representative of the gaseous composition to be analyzed,
   the gas sampling module being further configured to ionize said gas particles and to emit the ions produced, so as to generate an ion flow (I) having an ion composition representative of the gaseous composition to be analyzed,
   the gas sampling module being further suitable to maintain therein a controlled ionization pressure (Pi), the gas sampling module comprising:
   an inlet member, configured to inhibit or allow and/or adjust an inlet in the ionization chamber of the input gas flow (Fi), and comprising a gaseous flow adjusting interface, having a plurality of nano-holes, of sub-micrometer dimensions, suitable to be opened or closed, in a controlled manner, to allow or inhibit said plurality of micro-flows at a molecular or predominantly molecular regime;
   an ion outlet member, configured to inhibit or allow and/or adjust said output gaseous flow (Fo), at a molecular or predominantly molecular regime, and the ion flow (I) of the generated ions, said outlet member comprising an orifice, which can be opened or closed, in a controlled manner, so as to control an output conductance for the output gaseous flow (Fo);
   an ion filtering module, operatively connected to the gas sampling module to receive the ion flow (I), and configured to controllably select at least one type of ions present in the ion flow (I) and to generate a corresponding at least one homogeneous ion beam (I'), having an intensity representative of the concentration of the corresponding gas particle in the gaseous composition to be analyzed;

an ion detecting module, operatively connected to the ion filtering module to receive said at least one ion beam (I'), and configured to measure the intensity of the at least one ion beam (I') and to generate a corresponding electric signal (S) representative of the concentration of the corresponding gas particle in the gaseous composition to be analyzed;

wherein said input gaseous flow (Fi) comprises a plurality of micro-flows at a molecular or predominantly molecular regime, at the sampling pressure (Pc), and said output gaseous flow (Fo) is a flow at a molecular or predominantly molecular regime, at the ionization pressure (Pi).

2. The system according to claim 1, configured to analyze a gaseous flow that is variable over time in intensity and composition.

3. The system according to claim 1, configured to carry out an analysis of at least one flow (F) exiting a respective at least one gas-chromatographic column, wherein the sampling chamber is configured to allow a fluidic communication with the at least one gas-chromatographic column, so as to receive the at least one exiting flow (F).

4. The system according to claim 3, configured to carry out an analysis of a plurality of flows (F) at the output of respective gas-chromatographic columns.

5. The system according to claim 1, wherein said system is an integrated device, and wherein the sampling chamber is miniaturized and it is integrated in the integrated device.

6. The system according to claim 1, further comprising:

first pumping means, configured to extract gas from the sampling chamber, so as to control said sampling pressure (Pc);

second pumping means, configured to extract gas from said gas sampling module, so as to control said ionization pressure (Pi);

pumping control means;

a first miniaturized pumping member, installed in the ion filtering module, and/or a second pumping member installed in the gas sampling module of gas and/or a third pumping member installed in the ion detecting module, and wherein said pumping members are configured to keep in the gas sampling module an ionization pressure (Pi) ranging between $10^{-6}$ mbar and $10^{-2}$ mbar, to keep in the ion filtering module a filtering pressure (Pf) lower than the ionization pressure (Pi) and typically ranging between $10^{-5}$ and $10^{-7}$ mbar, and to keep in the ion detecting module a detection pressure (Pr) lower than the filtering pressure (Pf) and ranging between $10^{-6}$ and $10^{-8}$ mbar.

7. The system according to claim 6, wherein the gas sampling module further comprises:

an ionization chamber, suitable to be kept at the ionization pressure (Pi), and configured to contain and ionize said gas particles;

first actuating means, comprising a plurality of miniaturized nano-hole opening/closing members, each miniaturized opening/closing member being suitable to open or close a corresponding nano-hole, so as to maximize or minimize, respectively, the nano-hole conductance;

second actuating means, comprising a shutter, configured to completely close, or to keep completely open, or partially occlude in a controlled manner the orifice of the ion outlet member;

a sampling module control means, configured to control the first and second actuating means.

8. The system according to claim 7, wherein the ionization chamber comprises:

at least one ionization source;

an ionization region, containing gas particles that have entered through the at least one ionization source adjusting interface, the ionization region being arranged so as to ionize the gas particles, and generate corresponding ions;

first ion extracting means, configured to determine a preferred trajectory for the generated ions, passing through at least one first ion extraction window, through which the ions exit the ionization region, and to subsequently guide the ions toward the ion outlet member;

ionization chamber control means.

9. The system according to claim 3, wherein the ion filtering module comprises:

a filtering region, through which the ion beam (I) passes in order to be filtered, the filtering region comprising a second ion extraction window, through which said at least one homogeneous ion beam (I') exits the filtering region and the ion filtering module;

at least one electric and/or magnetic field generator, configured to generate in the filtering region an electric and/or magnetic field and/or potential, with an amplitude and/or frequency and/or spatial pattern that is variable in a controlled manner;

filtering module control means, configured to control said electric and/or magnetic field and/or potential in amplitude and/or frequency and/or spatial pattern, so as to control a trajectory or a filtering region passing-through speed, for the ions of the ion flow (I), as a function of the respective mass thereof.

10. The system according to the claim 9, wherein the gaseous flow (F) has a sequence of concentration peaks, each corresponding to a respective particle of the gaseous flow to be analyzed, together with further carrier gaseous particles of the gas-chromatographic column, and wherein the filtering module control means are further configured to shield said further carrier gaseous particles, and to extract from the second ion extraction window, at a given instant, the ions corresponding to the respective particle of the gaseous flow to be analyzed.

11. The system according to claim 7, wherein the ion detecting module comprises:

one or more detectors, each being configured to generate an electric signal (S) proportional to the intensity of the ion beam (I') incident therein;

detecting module control means.

12. The system according to claim 11, comprising:

a sampling member, in which the sampling chamber and the first pumping means are included;

an interface and control chip, in which at least the adjusting interface and the first actuating means of the gas sampling module and electronic processing means are implemented;

at least one processing chip, in which the ionization chamber, the ion outlet member, and the second actuating means, of the gas sampling module, and further the ion filtering module, the ion detecting module and the second pumping means are implemented;

wherein the sampling member is fluidically and operatively connected with the interface and control chip, wherein the interface and control chip overlaps the at least one processing chip, so that the respective portions of the gas sampling module match each other, and wherein the sampling member, the interface and control chip, and the at least one processing chip are connected so as to ensure a vacuum seal and to implement a single integrated device therewith.

13. System according to claim 12, comprising three processing chips, in which are formed, respectively:
the ionization chamber, the ion outlet member, and the second actuating means, of the gas sampling module,
the ion filtering module,
the ion detecting module and the second pumping means,
said three processing chips being mutually connected in a vacuum-proof manner, so as to allow a passage of ions from the ion outlet member of the gas sampling module to the filtering region of the ion filtering module up to the one or more detectors of the ion detecting_module,
and wherein each of said three processing chips comprises a vacuum-proof covering member.

14. A gas-chromatographic analysis apparatus, comprising:
a gas-chromatographic column;
a system for analyzing gaseous flow according to claim 1, or
a plurality of gas-chromatographic columns;
a system for analyzing gaseous flow according to claim 1.

15. A method for analyzing time-variable gaseous flows, by a portable analysis system, comprising the steps of:
producing a controlled sampling pressure (Pc), inside a sampling chamber of the system;
injecting into the sampling chamber at least one gaseous flow (F), having a gaseous composition to be analyzed, that is variable over time;
producing a controlled ionization pressure (Pi) in a sampling module of the system;
adjusting, in a controllable manner, an input gaseous flow (Fi) entering in the sampling module, at the controlled sampling pressure (Pc), from the sampling chamber, and an output gaseous flow (Fo) from the sampling module, so as to reproduce inside the sampling module a gaseous composition representative of the gaseous composition to be analyzed;
ionizing the gas particles inside the sampling module;
emitting the produced ions, so as to generate an ion flow (I) having an ion composition representative of the gaseous composition to be analyzed;
controllably selecting, by an ion filtering module of the system, at least one type of ion that is present in said ion flow (I), to generate a corresponding at least one homogeneous ion beam (I'), having an intensity representative of the concentration of the corresponding gas particle in the gaseous composition to be analyzed;
extracting the at least one homogeneous ion beam (I') from the ion filtering module;
measuring the intensity of said at least one ion beam (I'), by an ion detecting_module of the system, to generate a corresponding electric signal (S) representative of the concentration of the corresponding gas particle in the gaseous composition to be analyzed;
wherein said input gaseous flow (Fi) comprises a plurality of micro-flows at a molecular or predominantly molecular regime, at the sampling pressure (Pc), and said output gaseous flow (Fo) is a flow at a molecular or predominantly molecular regime, at the ionization pressure (Pi);

wherein said step of adjusting in a controllable manner an input gaseous flow (Fi) comprises: inhibiting or allowing and/or adjusting an inlet in the ionization chamber of the input gas flow (Fi), by means of a gaseous flow adjusting interface, having a plurality of nano-holes, of sub-micrometer dimensions, suitable to be opened or closed, in a controlled manner, to allow or inhibit said plurality of micro-flows at a molecular or predominantly molecular regime; and wherein said step of adjusting in a controllable manner an output gaseous flow (Fo) comprises: inhibiting or allowing and/or adjusting said output gaseous flow (Fo), at a molecular or predominantly molecular regime, and the ion flow (I) of the generated ions, by an orifice, which can be opened or closed, in a controlled manner, so as to control an output conductance for the output gaseous flow (Fo) at a molecular or predominantly molecular regime.

16. The method according to claim 15, wherein:
the step of injecting comprises injecting a gaseous flow (F) that is variable over time in intensity and composition, exiting one or more gas-chromatographic columns, said gaseous flow having a sequence of intensity peaks, each corresponding to a corresponding particle of the gaseous flow to be analyzed, and further comprising carrier gaseous particles of the gas-chromatographic column;
the step of selecting comprises further shielding said carrier gaseous particles;
the step of extracting comprises extracting, at a given instant, the ions corresponding to the respective particle of the gaseous flow to be analyzed;
the step of measuring comprises sequentially measuring the intensity of the at least one homogeneous ion beams (I') corresponding to the particles of the gaseous flow to be analyzed, according to the sequence of the input intensity peaks;
and wherein the ionization pressure (Pi) is a vacuum pressure, and it ranges between $10^{-6}$ mbar and $10^{-2}$ mbar;
and wherein the sampling pressure (Pc) is kept constant, or it is varied in a controllable manner, as a function of the gaseous flow (F) entering the sampling chamber (18), said sampling pressure (Pc) ranging between $10^{-3}$ mbar and $10^4$ mbar.

17. The system according to the claim 7, wherein the gaseous flow (F) has a sequence of concentration peaks, each corresponding to a respective particle of the gaseous flow to be analyzed, together with further carrier gaseous particles of the gas chromatographic column,
and wherein the system further comprises a filtering module control means configured to shield said further carrier gaseous particles, and to extract, at a given instant, the ions corresponding to the respective particle of the gaseous flow to be analyzed.

* * * * *